(12) United States Patent
Nakabayashi et al.

(10) Patent No.: US 11,183,929 B2
(45) Date of Patent: Nov. 23, 2021

(54) DC-DC POWER CONVERSION DEVICE HAVING BATTERY CONTROL

(71) Applicant: Mitsubishi Electric Corporation, Tokyo (JP)

(72) Inventors: Akinu Nakabayashi, Tokyo (JP); Mai Nakada, Tokyo (JP); Yoshihiro Takeshima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 170 days.

(21) Appl. No.: 16/464,505

(22) PCT Filed: Dec. 29, 2016

(86) PCT No.: PCT/JP2016/089212
§ 371 (c)(1),
(2) Date: May 28, 2019

(87) PCT Pub. No.: WO2018/123066
PCT Pub. Date: Jul. 5, 2018

(65) Prior Publication Data
US 2021/0119537 A1 Apr. 22, 2021

(51) Int. Cl.
*H02M 3/156* (2006.01)
*H02J 7/00* (2006.01)
(Continued)

(52) U.S. Cl.
CPC ........... *H02M 3/156* (2013.01); *H02J 7/0047* (2013.01); *H02J 7/0068* (2013.01);
(Continued)

(58) Field of Classification Search
CPC .................. H02J 3/322; H02M 3/156; H02M 2001/0025; H02M 2001/0016; H02M 2001/0022; H02M 2001/0003
See application file for complete search history.

(56) References Cited

U.S. PATENT DOCUMENTS

| | | | | |
|---|---|---|---|---|
| 6,489,755 | B1* | 12/2002 | Boudreaux, Jr. | H02M 1/15 323/282 |
| 2008/0219032 | A1* | 9/2008 | Stancu | H02M 3/1582 363/21.01 |
| 2009/0051337 | A1* | 2/2009 | Yoshida | H02M 3/158 323/283 |

(Continued)

FOREIGN PATENT DOCUMENTS

| | | |
|---|---|---|
| CN | 103378728 A | 10/2013 |
| JP | 2008-278564 A | 11/2008 |

(Continued)

OTHER PUBLICATIONS

The State Intellectual Property Office of the P.R. of China Communication dated Jul. 23, 2020, issued in Application No. 201680091849.1.

(Continued)

*Primary Examiner* — Alex Torres-Rivera
(74) *Attorney, Agent, or Firm* — Sughrue Mion, PLLC; Richard C. Turner

(57) ABSTRACT

A power conversion device including: a power conversion unit which is connected to two DC power supplies and performs power conversion; and a control unit which calculates a manipulated variable for controlling output voltage of the power conversion unit, wherein the manipulated variable for control is calculated on the basis of a voltage detection value on the primary side or the secondary side of the power conversion unit and a predetermined fixed value.

12 Claims, 21 Drawing Sheets

(51) Int. Cl.
  *H02M 1/00* (2006.01)
  *H02J 3/32* (2006.01)
(52) U.S. Cl.
  CPC ....... *H02M 1/0012* (2021.05); *H02M 1/0025* (2021.05); *H02J 3/322* (2020.01); *H02J 2310/48* (2020.01)

(56) References Cited

U.S. PATENT DOCUMENTS

| | | | | |
|---|---|---|---|---|
| 2010/0045102 A1* | 2/2010 | Kitanaka | ............. | H02M 3/1588 307/9.1 |
| 2010/0164446 A1* | 7/2010 | Matsuo | ................ | H02M 3/156 323/282 |
| 2015/0263617 A1* | 9/2015 | Xue | ..................... | H02M 3/156 323/271 |

FOREIGN PATENT DOCUMENTS

| | | |
|---|---|---|
| JP | 2010-161898 A | 7/2010 |
| JP | 2011-030363 A | 2/2011 |
| JP | 2015-077933 A | 4/2015 |
| JP | 2016-086468 A | 5/2016 |
| JP | 2016-086506 A | 5/2016 |

OTHER PUBLICATIONS

International Search Report for PCT/JP2016/089212, dated Apr. 4, 2017.
2nd Examination Opinion Notice dated Feb. 10, 2021 from the China National Intellectual Property Administration in CN Application No. 201680091849.1; 14 pages total with translation.

* cited by examiner

DC-DC POWER CONVERSION DEVICE HAVING BATTERY CONTROL

CROSS REFERENCE TO RELATED APPLICATIONS

This Application is a National Stage of International Application No. PCT/JP2016/089212 filed Dec. 29, 2016.

TECHNICAL FIELD

The present invention relates to a power conversion device having a DC-DC converter.

BACKGROUND ART

A hybrid vehicle having batteries for two different voltages has a DC-DC converter that converts high battery voltage to low battery voltage. To the batteries for two different voltages, electrical components that can operate in their respective voltage ranges are connected, and the DC-DC converter always performs control so as to keep the high battery voltage constant (for example, Patent Document 1).

CITATION LIST

Patent Document

Patent Document 1: Japanese Laid-Open Patent Publication No. 2010-161898

SUMMARY OF THE INVENTION

Problems to be Solved by the Invention

In Patent Document 1, during normal travelling, in the case where the battery voltage is not abnormally reduced, a control unit performs feedback control using an output voltage command value and an output voltage detection value, and at the same time, performs feedforward control using an input voltage detection value and an output voltage command value.

In this way, control is performed by calculating a manipulated variable for a power converter using the detected value of output voltage or input voltage. However, when the battery voltage is abnormally reduced, if the detected value of input voltage is abnormally reduced, the operation is switched from two controls of feedforward control and feedback control to only feedback control, and then, a calculation result of the feedback control is reduced, so that the voltage on the battery side on which the voltage has been abnormally reduced is further reduced. As a result, if the voltage falls below the operable lower limit voltage of an electrical component connected to the battery, a problem arises that continuous operation becomes impossible.

The present invention has been made to solve the above problem, and an object of the present invention is to enable control of battery voltage without falling below the operable lower limit voltage of an electrical component connected to a battery, even if the battery voltage has been abnormally reduced.

Solution to the Problems

A power conversion device according to the present invention includes: a power conversion unit having a primary-side terminal connected to a first DC power supply and a secondary-side terminal connected to a second DC power supply, the power conversion unit being configured to perform power conversion of power inputted from one of the primary-side terminal and the secondary-side terminal, and output the converted power from the other terminal; a first voltage detection unit configured to detect voltage between the power conversion unit and the primary-side terminal; a second voltage detection unit configured to detect voltage between the power conversion unit and the secondary-side terminal; and a control unit configured to calculate a manipulated variable for controlling output voltage of the power conversion unit, wherein the manipulated variable is calculated on the basis of a detected value from the first voltage detection unit or the second voltage detection unit and a predetermined fixed value.

Effect of the Invention

In the power conversion device according to the present invention, the manipulated variable is calculated on the basis of a predetermined fixed value, and therefore sharp change in the manipulated variable for controlling the power conversion unit can be prevented and thus power can be stably supplied.

DESCRIPTION OF EMBODIMENTS

Embodiment 1

Figure 1:
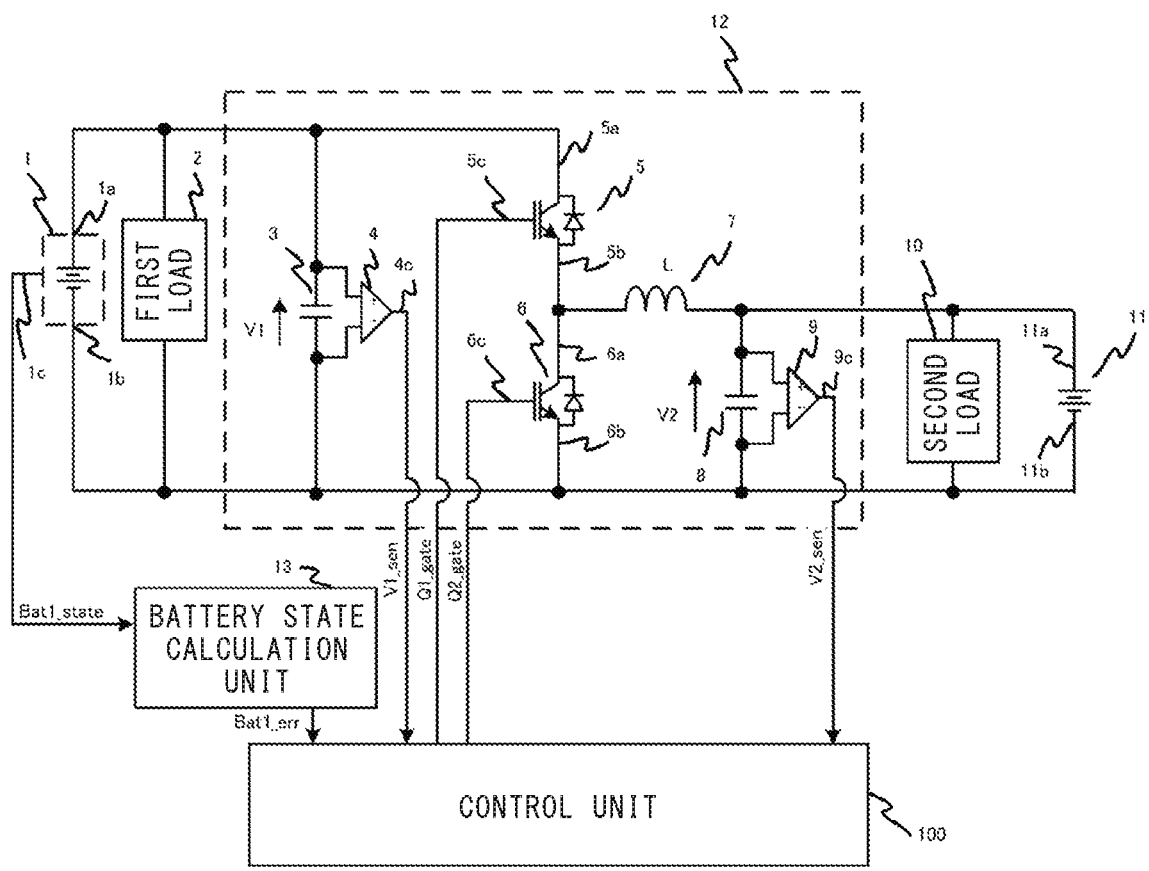
FIG. 1 is an entire configuration diagram of a power conversion device according to embodiment 1 of the present invention.

FIG. 1 is an entire configuration diagram of a power conversion device according to embodiment 1 of the present invention. This device includes: a power conversion unit 12 which outputs DC voltage; a control unit 100 which controls the power conversion unit 12; a battery state calculation unit 13 which calculates the battery state of a first battery 1; the first battery 1 capable of outputting a battery connection state; a first load 2; a second load 10; and a second battery 11. The power conversion unit 12, the control unit 100, and the battery state calculation unit form the power conversion device. In the present embodiment 1, the first load 2 and the second load 10 are electrical components.

The first battery 1 has a positive end 1a, a negative end 1b, and a signal output terminal 1c for outputting the connection state of the first battery 1. The primary side of the power conversion unit 12 and the first load 2 are connected in parallel to the positive end 1a and the negative end 1b, and the signal output terminal 1c is connected to the battery state calculation unit 13. The secondary side of the power conversion unit 12 and the second load 10 are connected in parallel to a positive end 11a and a negative end 11b of the second battery 11. The negative end 1b and the negative end 11b are connected to each other.

The power conversion unit 12 which performs DC-DC conversion includes a first switching element 5, a second switching element 6, a reactor 7, an input capacitor 3, an output capacitor 8, a first voltage detection unit 4, and a second voltage detection unit 9. In the present embodiment 1, insulated gate bipolar transistors (IGBT) are used as the first switching element 5 and the second switching element 6. The first voltage detection unit 4 has an output terminal 4c, and the output terminal 4c is connected to the control unit 100. The second voltage detection unit 9 has an output terminal 9c, and the output terminal 9c is connected to the control unit 100.

The first switching element 5 has a first main terminal 5a, a second main terminal 5b, and a control terminal 5c. The first main terminal 5a is connected to the positive end 1a of the first battery 1. The second switching element 6 has a first main terminal 6a, a second main terminal 6b, and a control terminal 6c. The first main terminal 6a is connected to the second main terminal 5b of the first switching element 5, and the second main terminal 6b is connected to the negative end 1b of the first battery 1.

One end of the reactor 7 is connected to the second main terminal 5b of the first switching element 5 (the first main terminal 6a of the second switching element 6), and the other end of the reactor 7 is connected to one end of the output capacitor 8.

The input capacitor 3 is connected in parallel to the first battery 1 and the first voltage detection unit 4. The output capacitor 8 is connected in parallel to the second battery 11 and the second voltage detection unit 9.

The battery state calculation unit 13 is connected to the signal output terminal 1c of the first battery 1.

The first battery 1 detects the circuit connection state of the battery and outputs a battery state signal Bat1_state from the signal output terminal 1c. On the basis of the battery state signal Bat1_state, the battery state calculation unit 13 determines the circuit connection state of the first battery 1. When the battery state calculation unit 13 has determined that the first battery 1 is disconnected from the circuit, the battery state calculation unit 13 outputs 1 as an error signal Bat1_err of the first battery 1, and when the battery state calculation unit 13 has determined that the first battery 1 is connected to the circuit, the battery state calculation unit 13 outputs 0. The error signal Bat1_err of the first battery 1 is inputted to the control unit 100.

Figure 2:
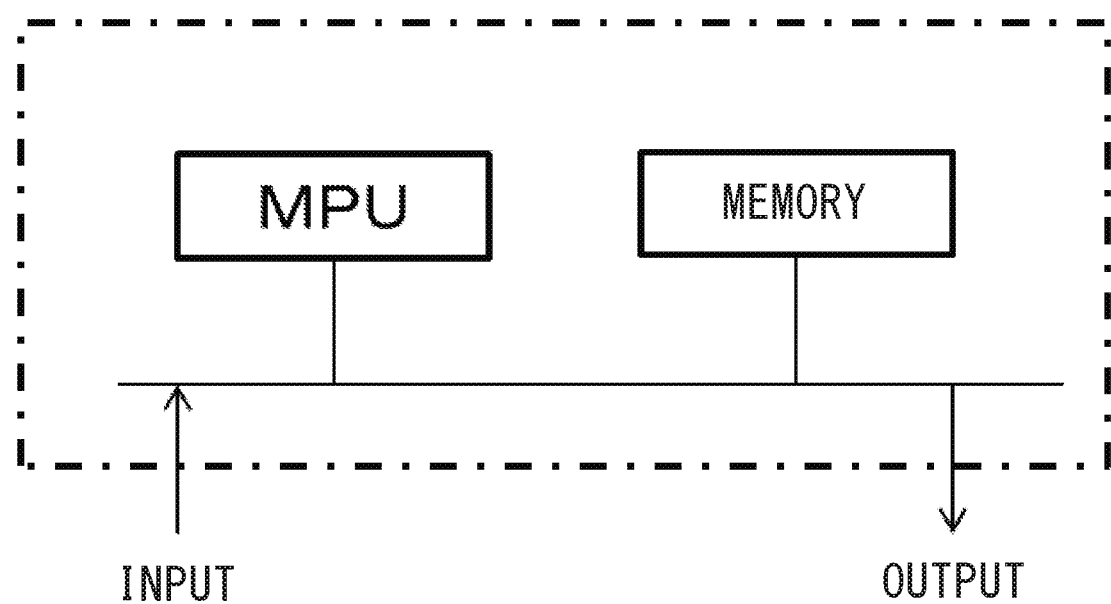
FIG. 2 is a configuration diagram of hardware of a control unit in embodiment 1 of the present invention.

The control unit 100 is connected to the battery state calculation unit 13, the output terminal 4c of the first voltage detection unit 4, the output terminal 9c of the second voltage detection unit 9, the control terminal 5c of the first switching element 5, and the output terminal 6c of the second switching element 6. As shown in FIG. 2, the control unit 100 may be implemented by combination of a processor (MPU) and a computer program stored in a memory, may be implemented by dedicated hardware such as ASIC, may be implemented by a reconfigurable gate array such as FPGA, or may be implemented by combination of these.

The first voltage detection unit 4 detects voltage applied to the input capacitor 3, and outputs a primary-side voltage detection value V1_sen to the control unit 100.

The second voltage detection unit 9 detects voltage applied to the output capacitor 8, and outputs a secondary-side voltage detection value V2_sen to the control unit 100.

On the basis of the primary-side voltage detection value V1_sen, the secondary-side voltage detection value V2_sen, an input voltage command value V1*, and an output voltage command value V2* that are inputted to the control unit 100, gate signals for driving the switching elements are calculated, and thus, a first gate signal Q1_gate is outputted to the control terminal 5c of the first switching element 5, and a second gate signal Q2_gate is outputted to the control terminal 6c of the second switching element 6.

Figure 3:
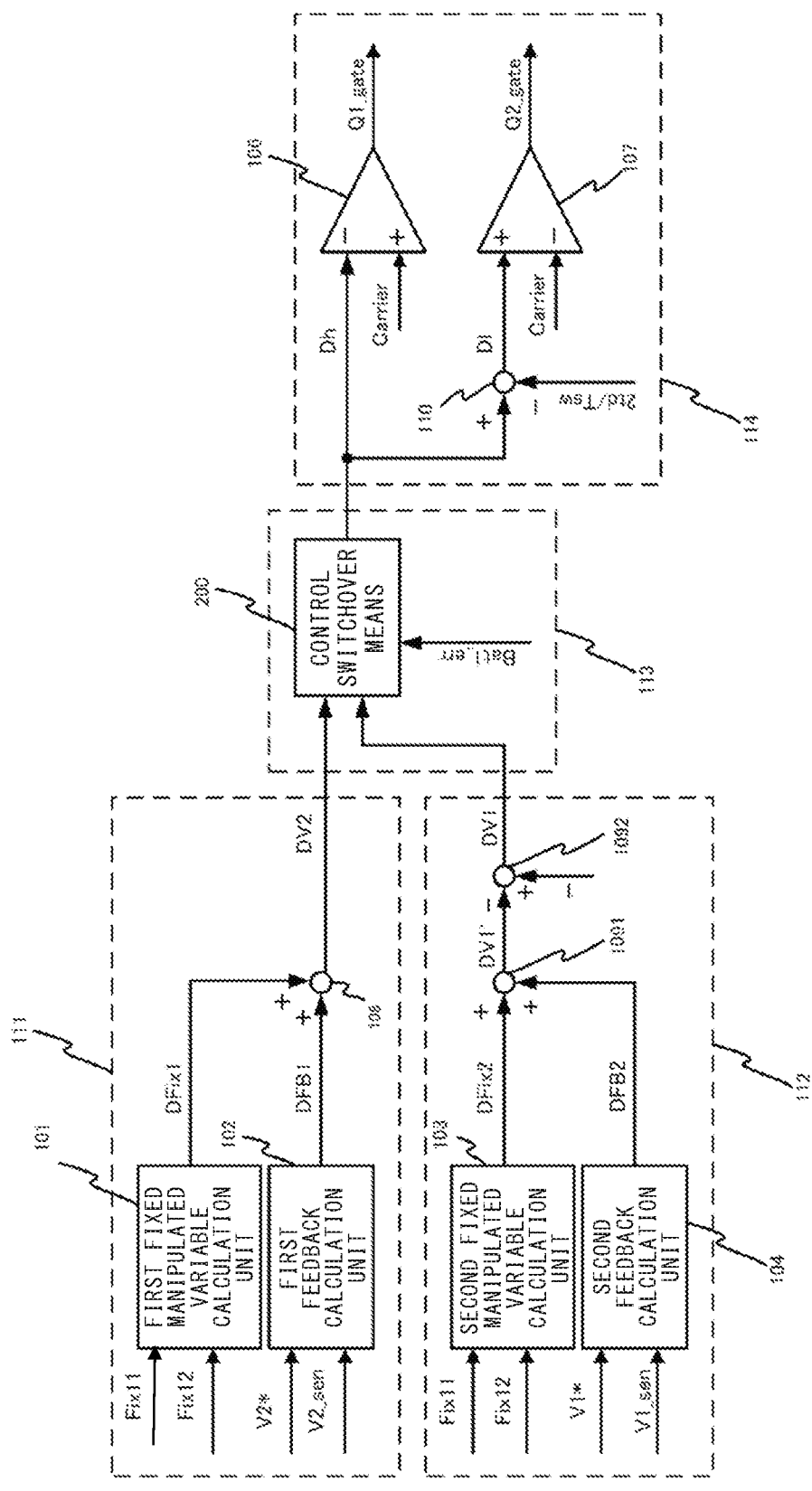
FIG. 3 is a function block diagram of the control unit in embodiment 1 of the present invention.

FIG. 3 is a function block diagram of the control unit 100 in embodiment 1.

The control unit 100 includes a secondary-side voltage constant control calculation unit 111, a primary-side voltage constant control calculation unit 112, a control switchover unit 113, and a gate drive signal generation unit 114. Outputs of the secondary-side voltage constant control calculation unit 111 and the primary-side voltage constant control calculation unit 112 are inputted to the control switchover unit 113, and output of the control switchover unit 113 is inputted to the gate drive signal generation unit 114.

The secondary-side voltage constant control calculation unit 111 includes a first fixed manipulated variable calculation unit 101, a first feedback calculation unit 102, and an addition unit 108.

The first fixed manipulated variable calculation unit 101 receives a first predetermined fixed value Fix11 and a second predetermined fixed value Fix12, and outputs a value calculated on the basis of these fixed values, as a first fixed manipulated variable DFix1.

The first feedback calculation unit 102 receives the secondary-side voltage detection value V2_sen and the output voltage command value V2*, and performs PID (Proportional-Integral-Differential) control or PI (Proportional-Integral) control on the basis of a difference between the secondary-side voltage detection value V2_sen and the output voltage command value V2*, to output a manipulated variable DFB1 of the first feedback calculation unit 102.

The addition unit 108 adds the first fixed manipulated variable DFix1 and the manipulated variable DFB1 of the first feedback calculation unit 102, to output a manipulated variable DV2 for the secondary-side voltage constant control.

The primary-side voltage constant control calculation unit 112 includes a second fixed manipulated variable calculation unit 103, a second feedback calculation unit 104, and an addition unit 1091.

As in the first fixed manipulated variable calculation unit 101 described above, the second fixed manipulated variable calculation unit 103 receives the first predetermined fixed value Fix11 and the second predetermined fixed value Fix12, and outputs a value calculated on the basis of these fixed values, as a second fixed manipulated variable DFix2.

The second feedback calculation unit 104 receives the primary-side voltage detection value V1_sen and the input voltage command value V1*, and performs PID control or PI control on the basis of a difference between the primary-side voltage detection value V1_sen and the input voltage command value V1*, to output a manipulated variable DFB2 of the second feedback calculation unit 104.

The addition unit 1091 adds the second fixed manipulated variable DFix2 and the manipulated variable DFB2 of the second feedback calculation unit 104, to output a manipulated variable DV1' for the second switching element 6 in primary-side voltage constant control, to a subtraction unit 1092. Since the sum of a manipulated variable DV1 for the primary-side voltage constant control which is a manipulated variable for the first switching element 5 and the manipulated variable DV1' for the second switching element 6 is 1, the subtraction unit 1092 subtracts the manipulated variable DV1' for the second switching element 6 from 1, to output the manipulated variable DV1 for the primary-side voltage constant control which is a manipulated variable for the first switching element 5.

Figure 4:
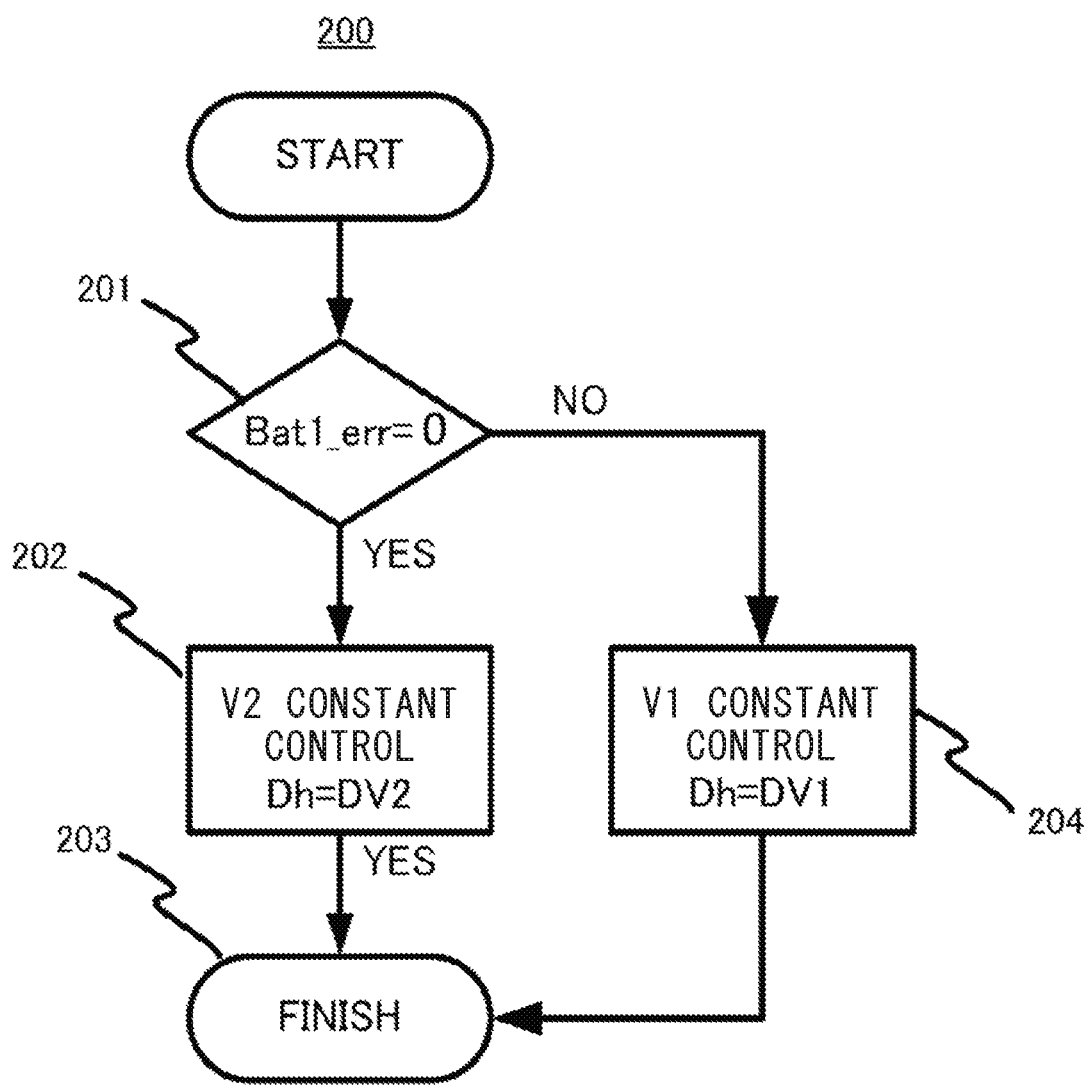
FIG. 4 is a flowchart of control switchover means in embodiment 1 of the present invention.

FIG. 4 is a flowchart of control switchover means 200 of the control switchover unit 113. The control switchover means 200 constantly receives the manipulated variable DV2 for the secondary-side voltage constant control and the manipulated variable DV1 for the primary-side voltage constant control, and in accordance with the error signal Bat1_err of the first battery 1, outputs the manipulated variable DV2 for the secondary-side voltage constant control or the manipulated variable DV1 for the primary-side voltage constant control, as a manipulated variable Dh for the first switching element 5.

That is, in normal case, the error signal Bat1_err of the first battery 1 is 0 and the first battery 1 is connected to the circuit. Therefore, for performing the secondary-side voltage constant control, the control switchover means 200 outputs the manipulated variable DV2 for the secondary-side voltage constant control as the manipulated variable Dh for the first switching element 5.

On the other hand, in abnormal case, the error signal Bat1_err of the first battery 1 is 1 and the first battery 1 is disconnected from the circuit. Therefore, for performing the primary-side voltage constant control, the control switchover means 200 outputs the manipulated variable DV1 for the primary-side voltage constant control as the manipulated variable Dh for the first switching element 5.

The gate drive signal generation unit 114 includes a comparator 106, a comparator 107, and a subtraction unit 110.

The comparator 106 receives output of the control switchover means 200 and a carrier wave Carrier. Output of the comparator 106 is connected to the control terminal 5c, and the comparator 106 outputs a first gate signal Q1_gate.

The subtraction unit 110 subtracts, from output of the control switchover means 200, 2 td/Tsw which is obtained by converting a dead time td in one cycle of an operation cycle Tsw to a manipulated variable, and outputs a manipulated variable D1 for the second switching element 6.

The comparator 107 receives the manipulated variable D1 for the second switching element 6 and the carrier wave Carrier. Output of the comparator 107 is connected to the control terminal 6c, and the comparator 107 outputs a second gate signal Q2_gate.

Figure 5:
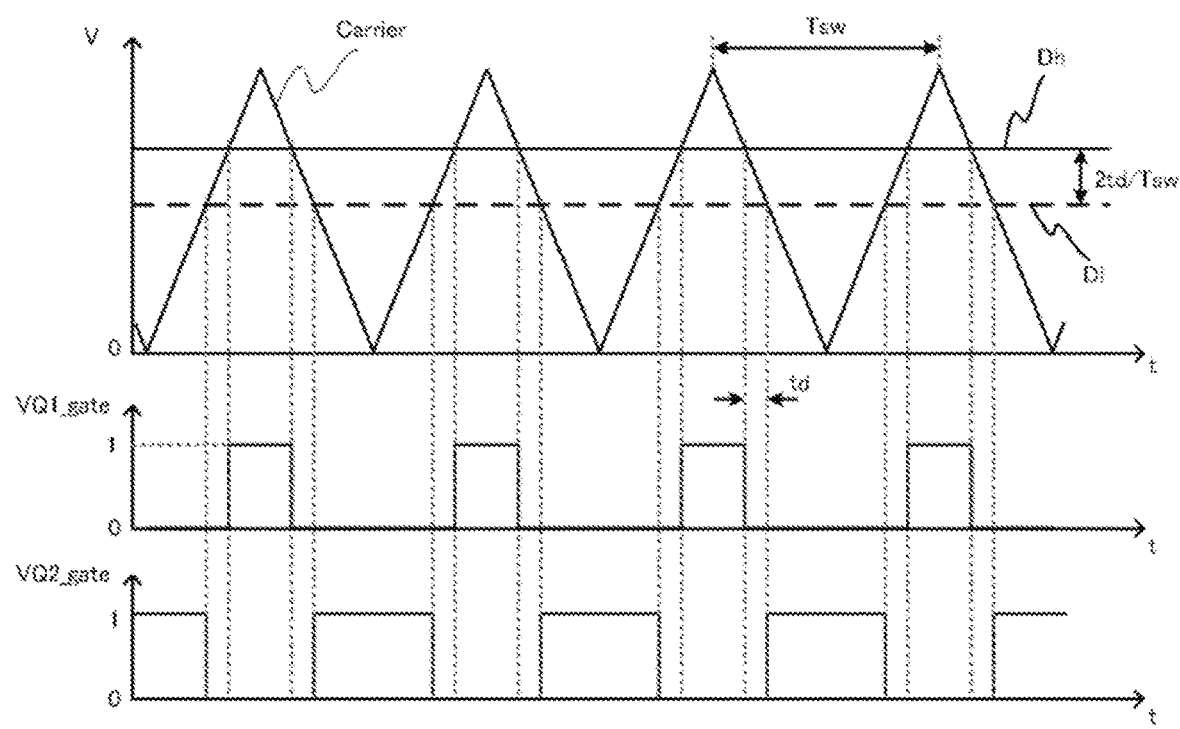
FIG. 5 shows generation of gate signals to be inputted to switching elements in embodiment 1 of the present invention.

FIG. 5 shows generation of the first gate signal Q1_gate and the second gate signal Q2_gate in embodiment 1. FIG. 5 shows waveforms of the manipulated variable Dh for the first switching element 5, the manipulated variable D1 for the second switching element 6, the carrier wave Carrier, the first gate signal Q1_gate, and the second gate signal Q2_gate. The comparator 106 compares the manipulated variable Dh for the first switching element 5 with the carrier wave Carrier. If the manipulated variable Dh for the first switching element 5 is greater, the first gate signal Q1_gate is outputted as 1, and if the manipulated variable Dh is smaller, the first gate signal Q1_gate is outputted as 0. Meanwhile, the comparator 107 compares the manipulated variable D1 for the second switching element 6 with the carrier wave Carrier. If the manipulated variable D1 for the second switching element 6 is greater, the second gate signal Q2_gate is outputted as 1, and if the manipulated variable D1 is smaller, the second gate signal Q2_gate is outputted as 0.

In FIG. 5, the dead time td is provided between a time at which the first gate signal Q1_gate falls and a time at which the second gate signal Q2_gate rises, and between a time at which the second gate signal Q2_gate falls and a time at which the first gate signal Q1_gate rises. The dead time td ensures the minimum period that prevents the first switching element 5 and the second switching element 6 from being turned on at the same time. This is because, if the first switching element 5 and the second switching element 6 are turned on at the same time, the first battery 1 is short-circuited. The manipulated variable D1 for the second switching element 6 is calculated by subtracting, from the manipulated variable Dh for the first switching element 5, a value obtained by converting the dead time td to a manipulated variable for the power conversion unit 12 using the operation cycle Tsw. It is noted that, since the dead time is provided twice in one cycle of the operation cycle Tsw, 2 td/Tsw is subtracted from the manipulated variable Dh for the first switching element 5.

Next, operation of the power conversion device in embodiment 1 will be described.

First, operation in normal case where the primary-side voltage V1 is not abnormally reduced will be described.

In normal case, the power conversion unit 12 performs switching control of the first switching element 5 and the second switching element 6, so as to step down voltage of the first battery 1 which is the primary-side voltage V1, to voltage of the second battery 11 which is the secondary-side voltage V2, thus performing the secondary-side voltage constant control.

The secondary-side voltage constant control calculation unit 111 of the control unit 100 outputs the manipulated variable DV2 for the secondary-side voltage constant control which is a calculation result obtained by adding: the first fixed manipulated variable DFix1 of the first fixed manipulated variable calculation unit 101 which performs fixed manipulated variable calculation using the first predetermined fixed value Fix11 and the second predetermined fixed value Fix12; and the manipulated variable DFB1 of the first feedback calculation unit 102 which performs feedback calculation using the output voltage command value V2* and the secondary-side voltage detection value V2_sen.

The calculation of the first fixed manipulated variable DFix1 is uniquely determined by the fixed value Fix11, the fixed value Fix12, and a logical formula. In the case of the power conversion unit 12 in the present embodiment, the calculation is represented as follows.

$$DFix1 = Fix11/Fix12$$

The above formula changes if the circuit configuration of the power conversion unit 12 changes.

Next, in abnormal case where the primary-side voltage V1 is abnormally reduced, the power conversion unit 12 performs switching control of the first switching element 5 and the second switching element 6, so as to step up voltage of the first battery 1 to voltage of the second battery 11, thus performing the primary-side voltage constant control.

The primary-side voltage constant control calculation unit 112 of the control unit 100 outputs the manipulated variable DV1 for the primary-side voltage constant control which is a calculation result obtained by adding: the second fixed manipulated variable DFix2 outputted from the second fixed manipulated variable calculation unit 103; and the manipulated variable DFB2 for the second feedback calculation unit 104 which performs feedback calculation using the input voltage command value V1* and the primary-side voltage detection value V1_sen. As in the calculation of the first fixed manipulated variable DFix1, the calculation of the second fixed manipulated variable DFix2 is uniquely determined by the fixed value Fix11, the fixed value Fix12, and a logical formula. In the case of the power conversion unit 12 in the present embodiment, the calculation is represented as follows.

$$DFix2 = Fix11/Fix12$$

The above formula changes if the circuit configuration of the power conversion unit 12 changes.

Figure 6:
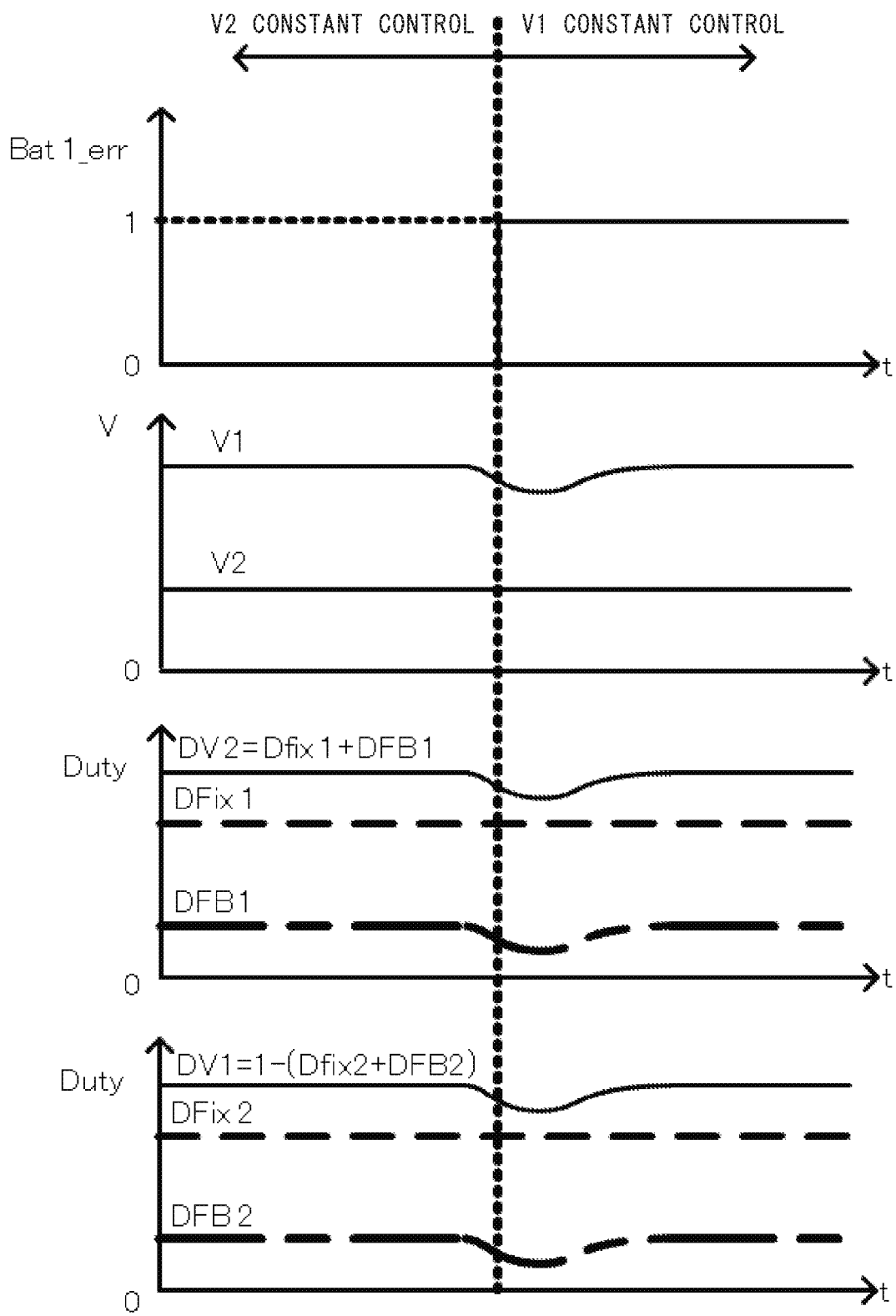
FIG. 6 is a conceptual diagram of operation waveforms in embodiment 1 of the present invention.

FIG. 6 is a conceptual diagram of operation waveforms of the error signal Bat1_err of the first battery 1, the primary-side voltage V1, the secondary-side voltage V2, the manipulated variable DV2 for the secondary-side voltage constant control, and the manipulated variable DV1 for the primary-side voltage constant control.

The manipulated variable DV1 for the primary-side voltage control and the manipulated variable DV2 for the secondary-side voltage constant control are constantly calculated by the control unit 100, and in the case where the error signal Bat1_err of the first battery 1 is 0, the secondary-side voltage constant control is performed using the manipulated variable DV2 for the secondary-side voltage constant control.

On the other hand, when abnormal reduction of the primary-side voltage V1 is detected, the error signal Bat1_err of the first battery 1 becomes 1. In the case where the error signal Bat1_err of the first battery 1 is 1, the secondary-side voltage constant control using the manipulated variable DV2 for the secondary-side voltage constant control is switched to perform the primary-side voltage constant control using the manipulated variable DV1 for the primary-side voltage control. Thus, even if the error signal Bat1_err of the first battery 1 becomes 1, the value of the second fixed manipulated variable DFix2 included in the manipulated variable DV1 can suppress change in the manipulated variable for the power conversion unit 12, whereby a value close to a desired manipulated variable can be obtained even just after the switchover. Thus, reduction in the primary-side voltage V1 is suppressed and the voltage is prevented from falling below the operable minimum voltage of the first load 2, whereby the first load 2 can be continuously operated and more stable operation than in the conventional one can be achieved.

In embodiment 1 of the present invention, the case where the power conversion unit 12 is a step-down converter has been described. However, any circuit type that is capable of DC-DC conversion and bidirectional power transmission, may be applied.

In embodiment 1 of the present invention, the case of using IGBT as the switching elements has been described. However, the same effects can be obtained even by using a bipolar transistor, a field-effect transistor (MOSFET), a silicon carbide MOSFET, or a gallium nitride high-electron-mobility transistor (HEMT).

In embodiment 1 of the present invention, the comparator 106 and the comparator 107 are used for generating the gate signals for the first switching element 5 and the second switching element 6. However, any method may be adopted as long as the calculated manipulated variable for the power conversion device can be modulated into gate signals.

Embodiment 2

Figure 7:
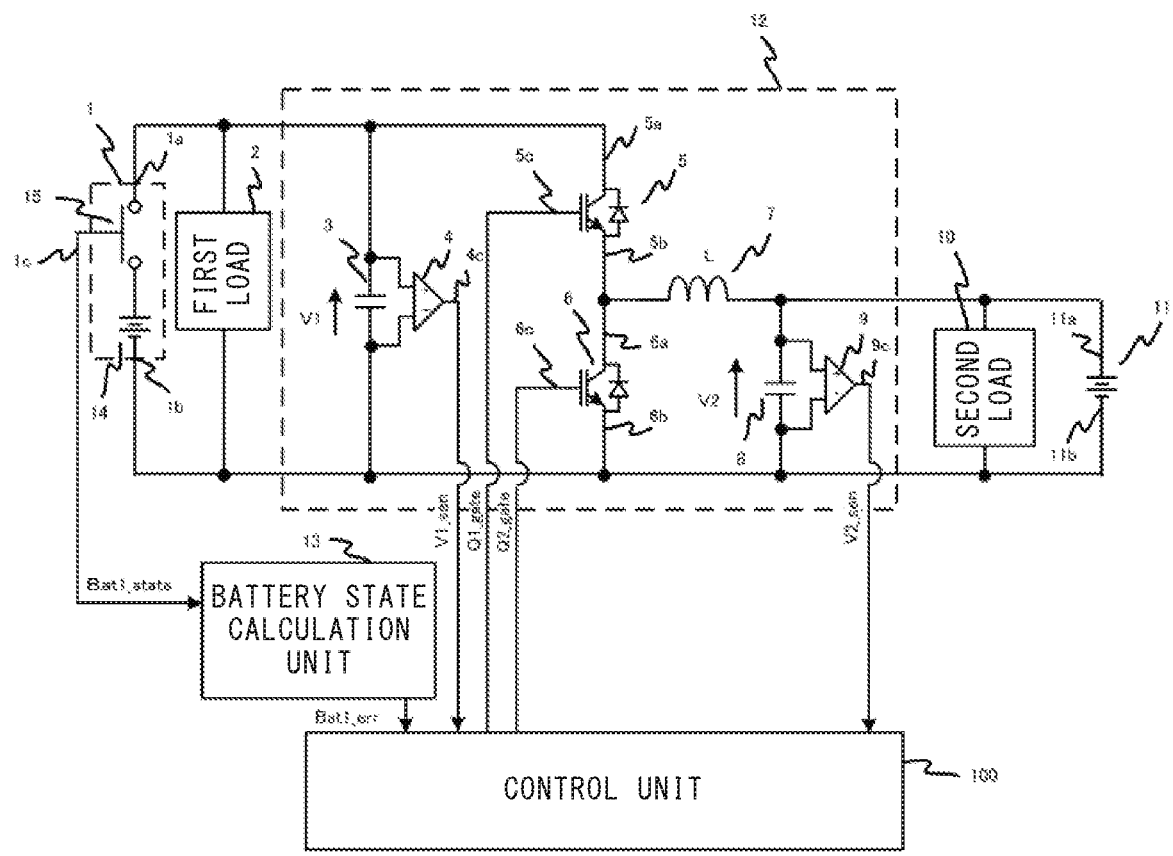
FIG. 7 is an entire configuration diagram of a power conversion device according to embodiment 2 of the present invention.

FIG. 7 is an entire configuration diagram of a power conversion device according to embodiment 2 of the present invention. The circuit configuration and operation of the power conversion device according to embodiment 2 of the present invention are basically the same as those shown in FIG. 1 in the above embodiment 1. Hereinafter, a configuration different from FIG. 1 will be described.

In FIG. 7, the first battery 1 is composed of a relay switch unit 15 and a battery unit 14, and the relay switch unit 15 outputs the battery state signal Bat1_state from the signal output terminal 1c to the battery state calculation unit 13. In the present embodiment 2, the relay switch unit 15 is formed by a semiconductor, and has a function of protecting the first battery 1 by disconnecting the first battery 1 from the circuit when overcurrent, overvoltage, or overcharging occurs in the first battery 1.

Figure 8:
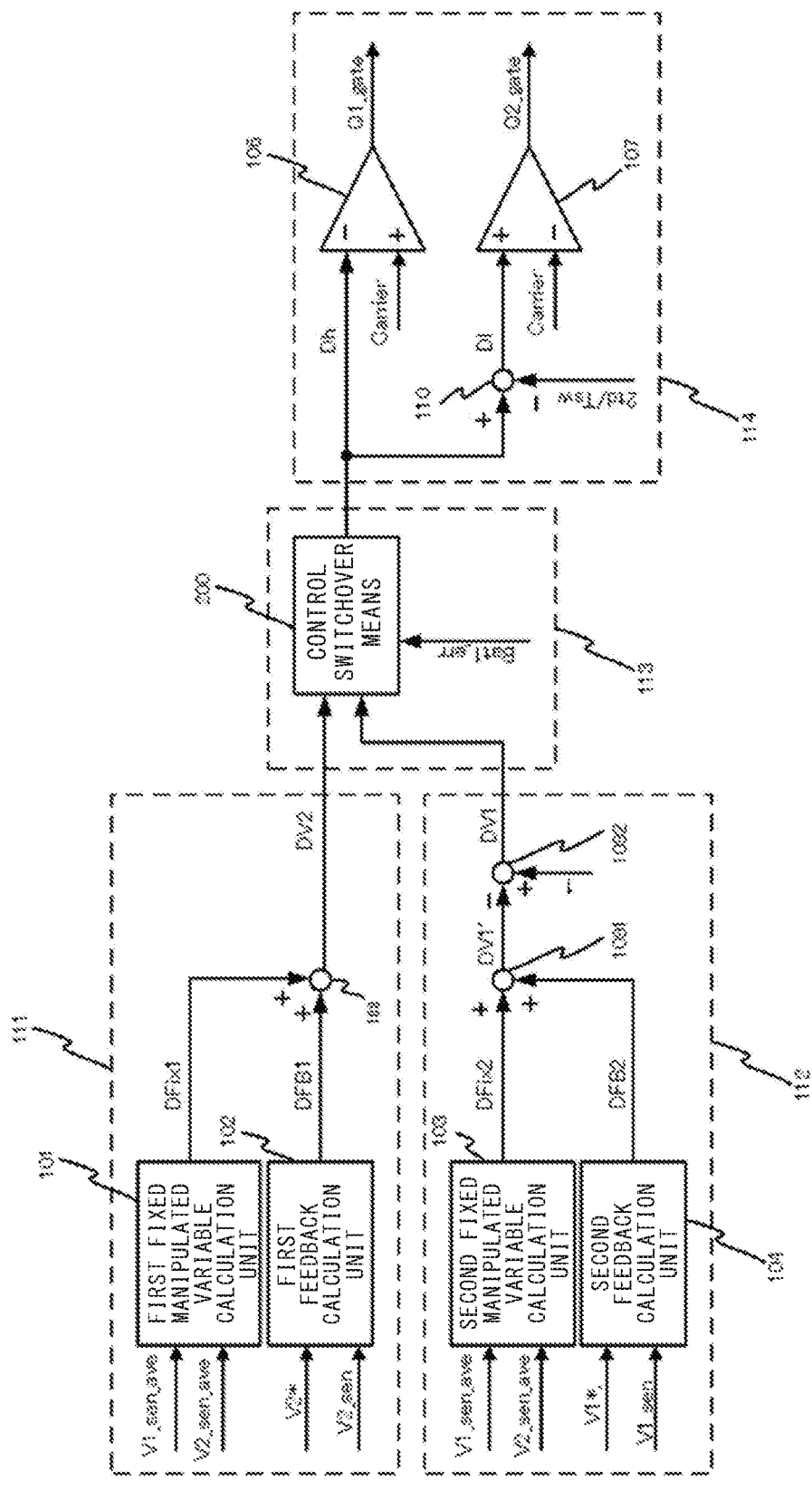
FIG. 8 is a function block diagram of a control unit in embodiment 2 of the present invention.

FIG. 8 is a function block diagram of the control unit 100 in embodiment 2 of the present invention. The control function thereof is basically the same as that in embodiment 1. Difference from FIG. 2 in embodiment 1 is that inputs to the first fixed manipulated variable calculation unit 101 and inputs to the second fixed manipulated variable calculation unit 103 are an average value V1_sen_ave of the primary-side voltage detection value V1_sen and an average value V2_sen_ave of the secondary-side voltage detection value V2_sen. The average value V1_sen_ave of the primary-side voltage detection value V1_sen and the average value V2_sen_ave of the secondary-side voltage detection value V2_sen are average values from the start of operation of the power conversion device.

Figure 9:
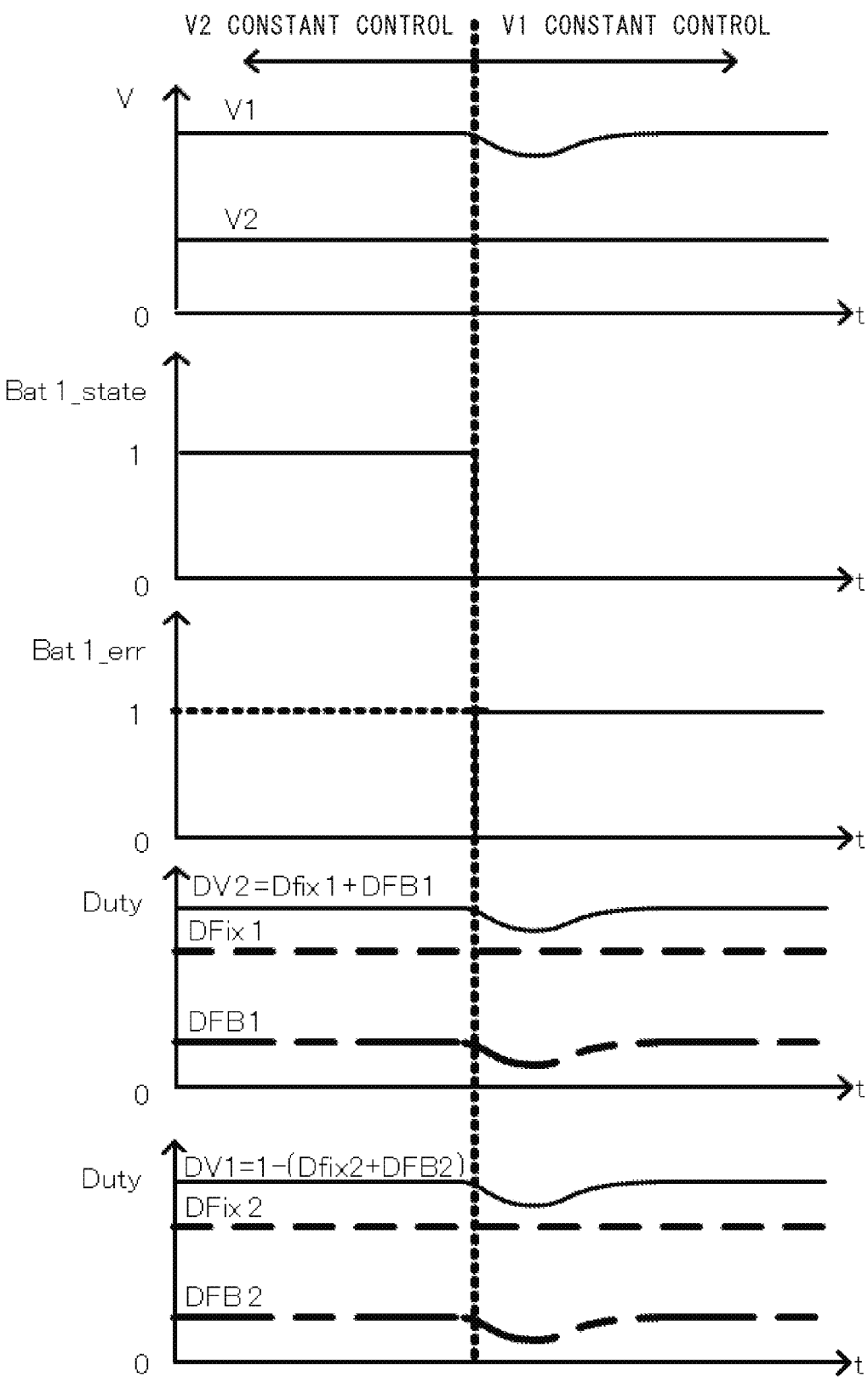
FIG. 9 is a conceptual diagram of constant control voltage switchover based on a battery state signal in embodiment 2 of the present invention.

FIG. 9 is a conceptual diagram of constant control voltage switchover based on the battery state signal Bat1_state in embodiment 2 of the present invention.

When the relay switch unit 15 disconnects the first battery 1 from the circuit, the battery state signal Bat1_state changes from 1 to 0. On the basis of the battery state signal Bat1_state, the battery state calculation unit 13 determines the connection state of the first battery 1, and changes the error signal Bat1_err of the first battery 1 from 0 to 1. Thus, constant control voltage switchover based on the battery state signal Bat1_state can be performed.

Figure 10:
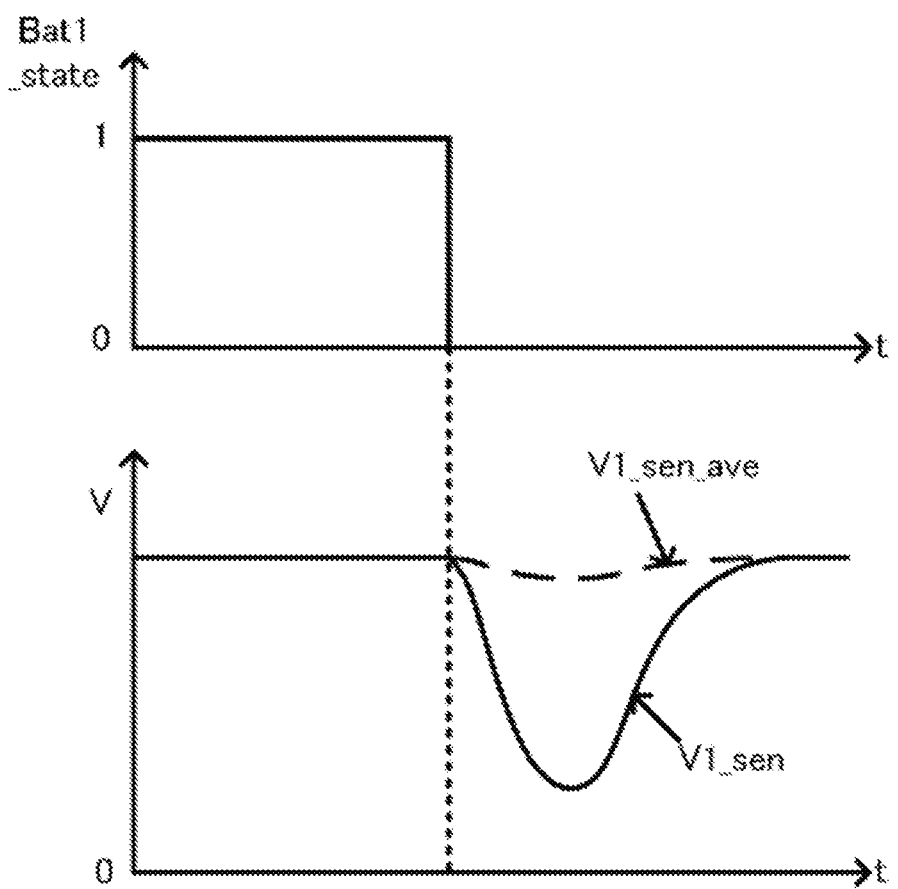
FIG. 10 is a schematic operation waveform diagram of a primary-side voltage detection value and the average value thereof, before and after constant control switchover, in embodiment 2 of the present invention.

FIG. 10 is a schematic operation waveform diagram of the battery state signal Bat1_state, the primary-side voltage detection value V1_sen, and the average value V1_sen_ave thereof.

The first fixed manipulated variable calculation unit 101 receives the average value V1_sen_ave of the primary-side voltage detection value V1_sen and the average value V2_sen_ave of the secondary-side voltage detection value V2_sen, and calculates the first fixed manipulated variable DFix1. By inputting the average value V1_sen_ave of the primary-side voltage detection value V1_sen, it is possible to suppress influence of sharp change in the primary-side voltage detection value V1_sen. Thus, sharp change in the manipulated variable Dh for the first switching element 5 can be suppressed, and sharp change in the primary-side voltage V1 is suppressed, whereby it becomes possible to perform voltage control so as not to fall below the operable lower limit voltage of the first load 2.

Similarly, the second fixed manipulated variable calculation unit 103 receives the average value V2_sen_ave of the secondary-side voltage detection value V2_sen and the average value V1_sen_ave of the primary-side voltage detection value V1_sen, and calculates the second fixed manipulated variable DFix2.

In the present embodiment 2, the case where a semiconductor switch capable of outputting the battery state signal is used as the relay switch unit 15 has been described. However, since the control is performed on the basis of the primary-side voltage detection value V1_sen, the same effects can be obtained even by using a mechanical switch such as a thermal fuse.

Embodiment 3

Figure 11:
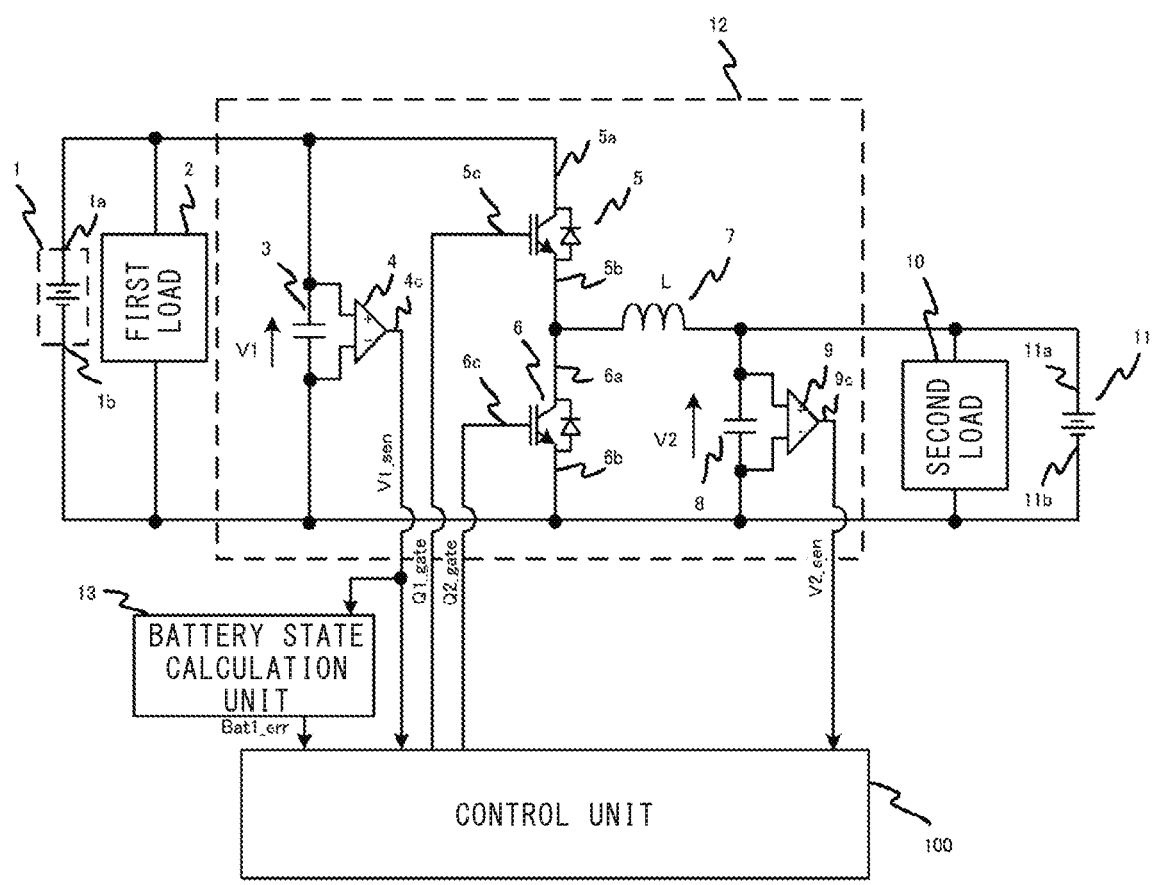
FIG. 11 is an entire configuration diagram of a power conversion device according to embodiment 3 of the present invention.

FIG. 11 is an entire configuration diagram of a power conversion device according to embodiment 3 of the present invention. The circuit configuration and operation of the power conversion device according to embodiment 3 of the present invention are basically the same as those shown in FIG. 1 in embodiment 1. Hereinafter, a configuration different from FIG. 1 will be described.

The battery state signal Bat1_state is not outputted from the first battery 1, and the first voltage detection unit 4 outputs the primary-side voltage detection value V1_sen to the control unit 100 and the battery state calculation unit 13.

Figure 12:
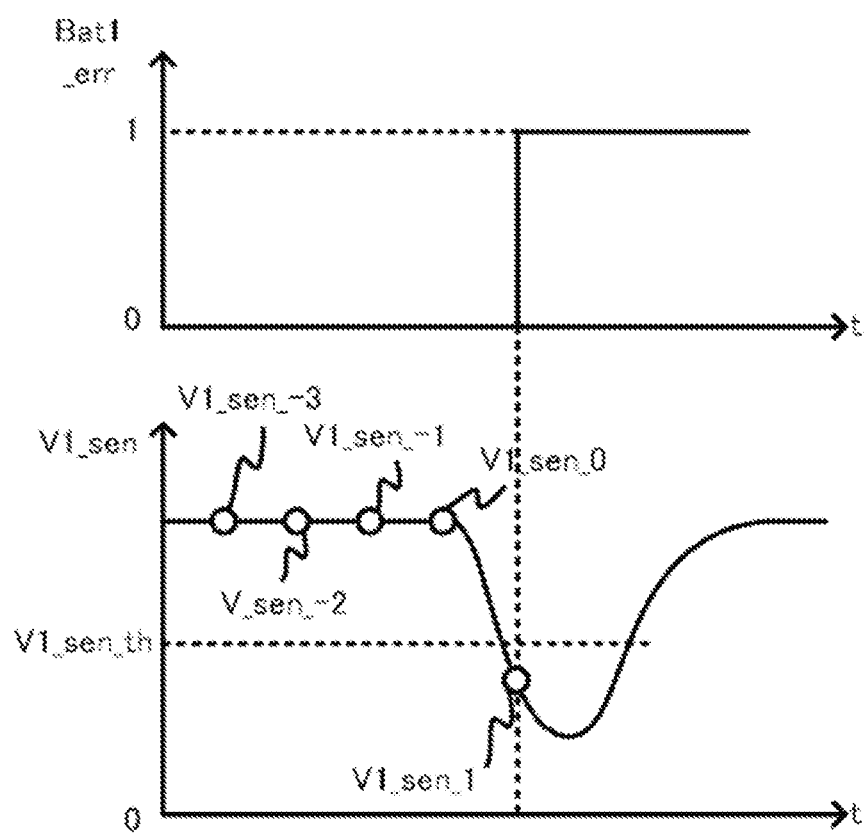
FIG. 12 is a schematic operation waveform diagram of a battery state signal and a primary-side voltage detection value in embodiment 3 of the present invention.

FIG. 12 is a schematic operation waveform diagram of the battery state signal Bat1_state and the primary-side voltage detection value V1_sen. In FIG. 12, a primary-side voltage detection value V1_sen_1 is the latest value, and the primary-side voltage detection values before this value are V1_sen_0, V1_sen_-1, V1_sen_-2, and then V1_sen_-3. If the latest primary-side voltage detection value V1_sen_1 falls below a threshold value V1_sen_th, the battery state calculation unit 13 determines that the input voltage is abnormally reduced, and outputs the error signal Bat1_err of the first battery 1 set as 1, to the control unit 100.

Figure 13:
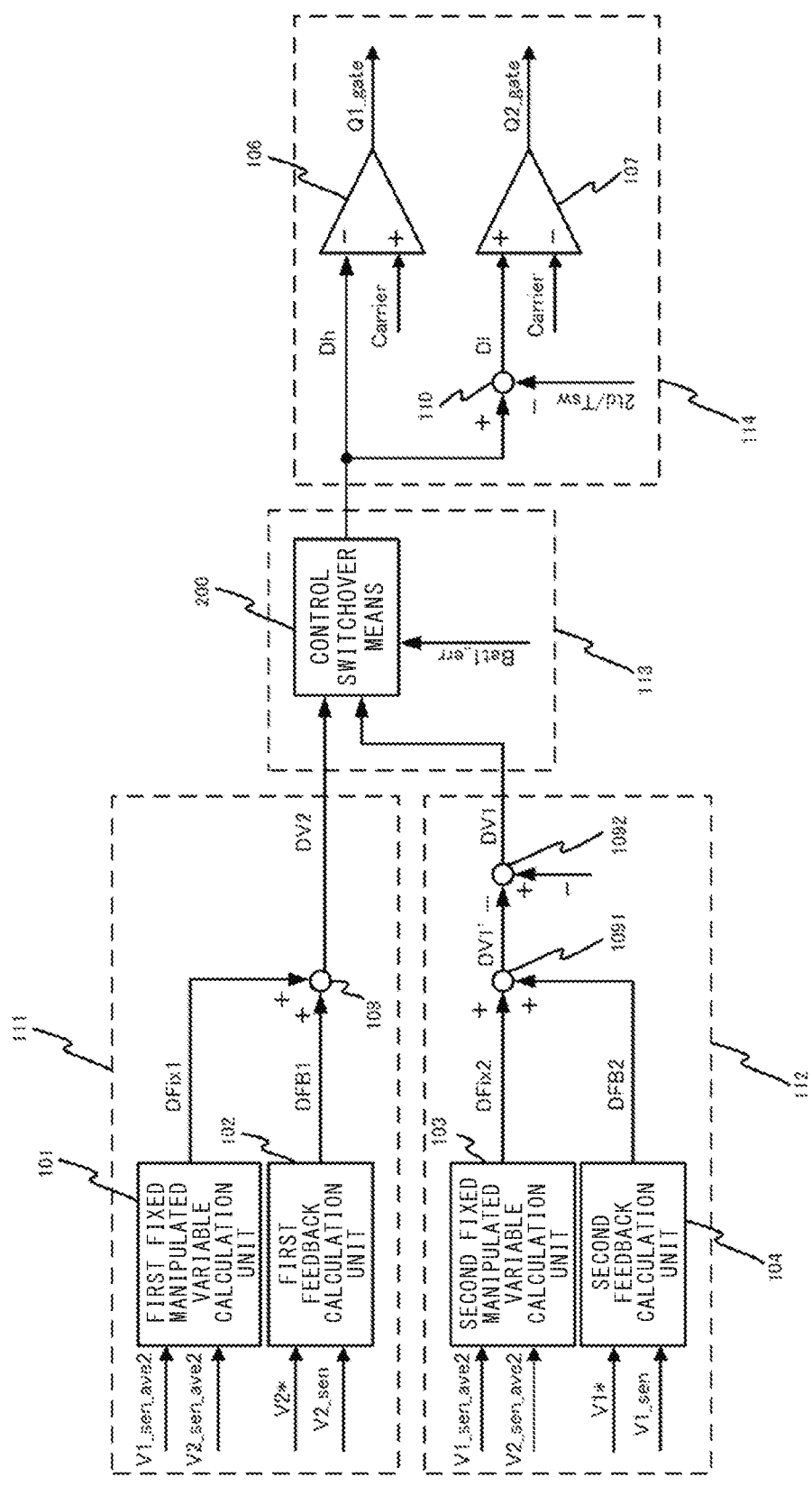
FIG. 13 is a function block diagram of a control unit in embodiment 3 of the present invention.

FIG. 13 is a function block diagram of the control unit 100 in the present embodiment 3. The control function is basically the same as that in embodiment 1. Difference from FIG. 2 in embodiment 1 is that inputs to the first fixed manipulated variable calculation unit 101 and inputs to the second fixed manipulated variable calculation unit 103 are an average value V1_sen_ave2 of the primary-side voltage detection value V1_sen and an average value V2_sen_ave2 of the secondary-side voltage detection value V2_sen before abnormality determination.

Figure 14:
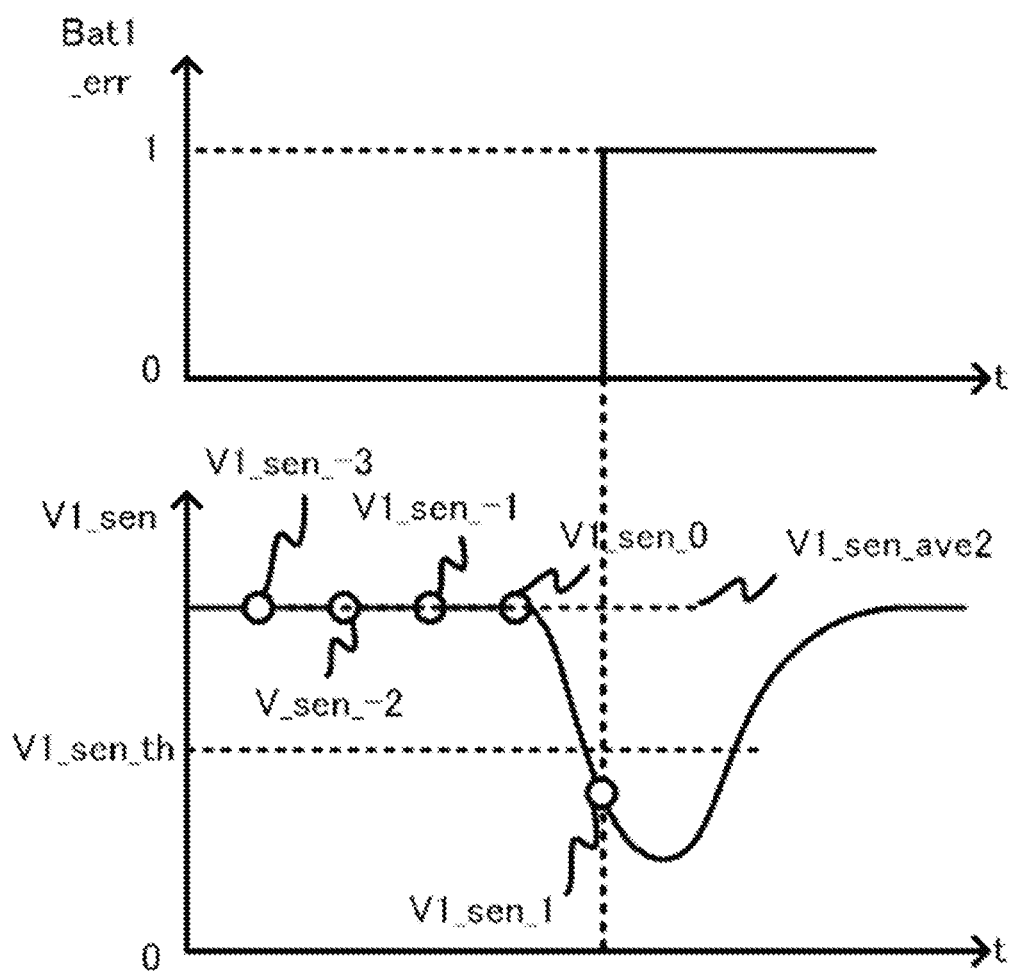
FIG. 14 is a schematic operation waveform diagram of a primary-side voltage detection value and the average value thereof, before and after constant control switchover, in embodiment 3 of the present invention.

FIG. 14 is a schematic operation diagram of the error signal Bat1_err of the first battery 1, the primary-side voltage detection value V1_sen, and the average value V1_sen_ave2 thereof.

The first fixed manipulated variable calculation unit 101 receives the average value V1_sen_ave2 of the primary-side voltage detection value V1_sen before abnormality determination, and the average value V2_sen_ave2 of the secondary-side voltage detection value V2_sen before abnormality determination, and calculates the first fixed manipulated variable DFix1. Thus, sharp change in the manipulated variable Dh for the first switching element 5 can be suppressed, and sharp change in the primary-side voltage V1 is suppressed, whereby it becomes possible to perform voltage control so as not to fall below the operable lower limit voltage of the first load 2.

Similarly, the second fixed manipulated variable calculation unit 103 receives the average value V2_sen_ave2 of the secondary-side voltage detection value before abnormality determination, and the average value V1_sen_ave of the primary-side voltage detection value V1_sen before abnormality determination, and calculates the second fixed manipulated variable DFix2.

Embodiment 4

Figure 15:
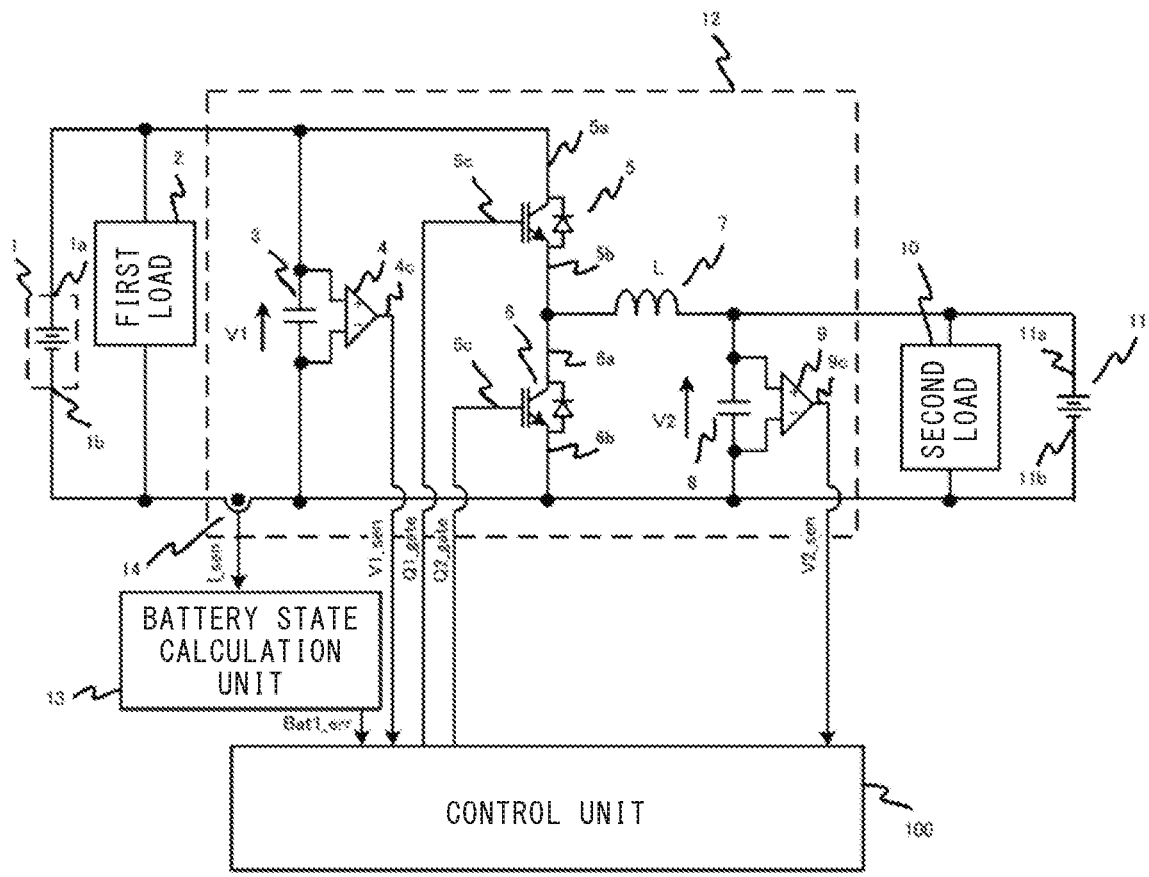
FIG. 15 is an entire configuration diagram of a power conversion device according to embodiment 4 of the present invention.

FIG. 15 is an entire configuration diagram of a power conversion device according to embodiment 4 of the present invention. The circuit configuration and operation of the power conversion device according to embodiment 4 of the present invention are basically the same as those shown in embodiment 1. Therefore, description of the same parts is omitted and only difference will be described.

The difference is that the battery state signal Bat1_state is not outputted from the first battery 1 and a current detection unit 16 outputs the current detection value I_sen to the battery state calculation unit 13. On the basis of the current detection value I_sen, the battery state calculation unit 13 outputs the error signal Bat1_err of the first battery 1 to the control unit 100.

Figure 16:
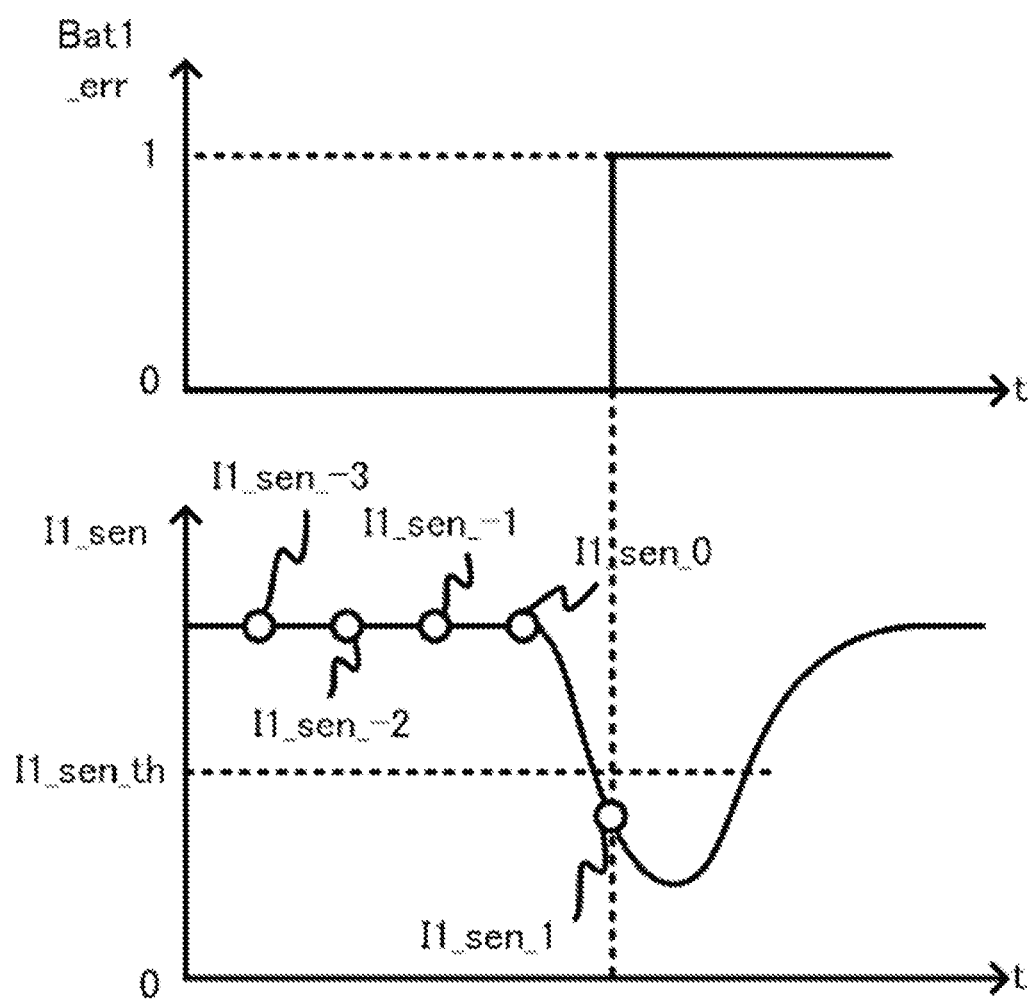
FIG. 16 is a schematic operation waveform diagram of a battery state signal and a current detection value in embodiment 4 of the present invention.

FIG. 16 is a schematic operation waveform diagram of the battery state signal Bat1_state and a first current detection value I1_sen. In FIG. 16, a first current detection value I1_sen_1 is the latest value, and the first current detection values before this value are I1_sen_0, I1_sen_-1, I1_sen_-2, and then I1_sen_-3. If the latest first current detection value I1_sen falls below a threshold value I1_sen_th, the battery state calculation unit 13 determines that the input voltage is abnormally reduced, and outputs the error signal Bat1_err of the first battery 1 set as 1, to the control unit 100.

Figure 17:
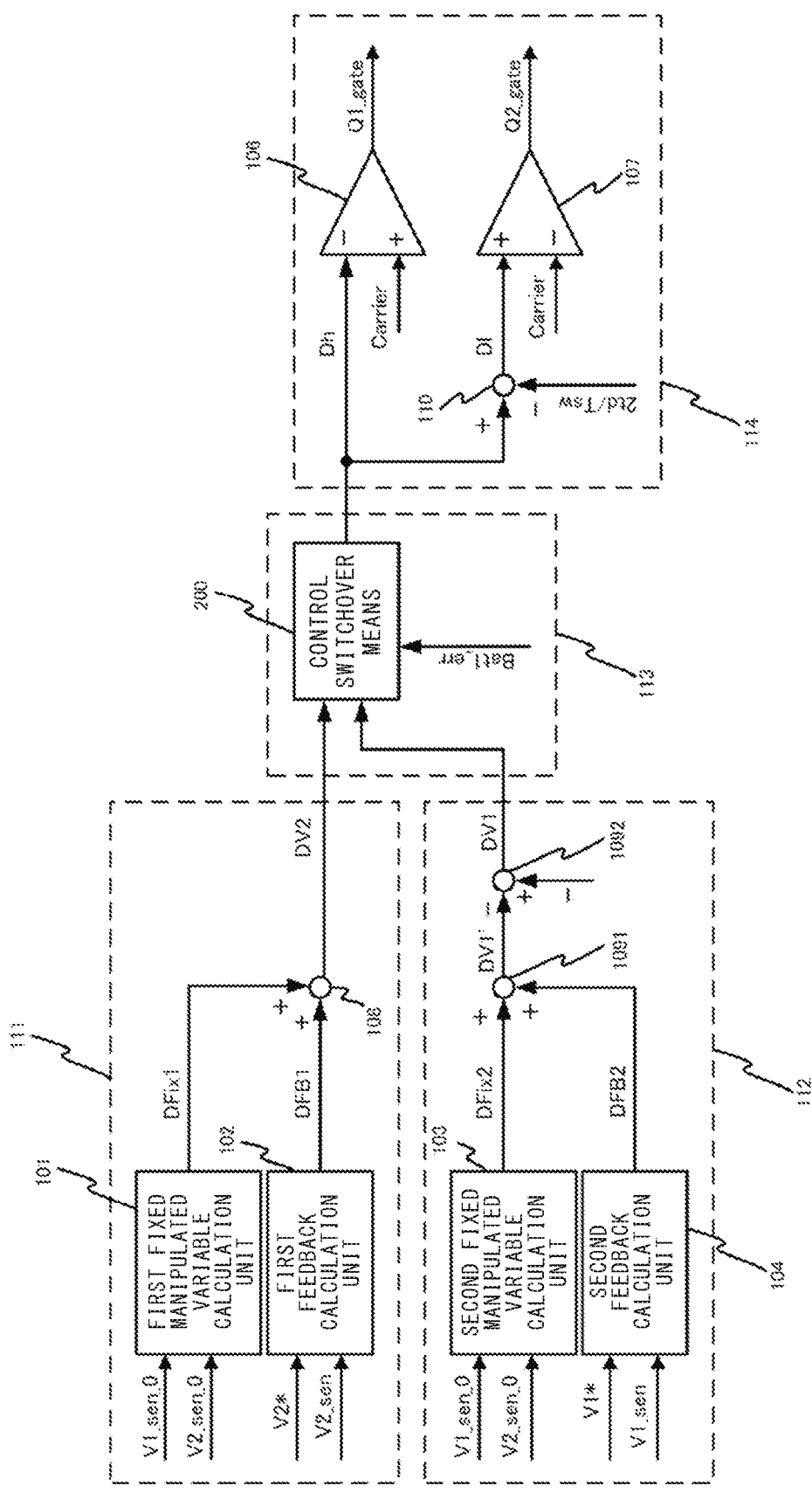
FIG. 17 is a function block diagram of a control unit in embodiment 4 of the present invention.

FIG. 17 is a function block diagram of the control unit 100. The control function is basically the same as that in embodiment 1, and therefore only difference will be described.

Difference from FIG. 2 in embodiment 1 is that inputs to the first fixed manipulated variable calculation unit 101 and inputs to the second fixed manipulated variable calculation unit 103 are a primary-side voltage detection value V1_sen_0 just before abnormality determination and a secondary-side voltage detection value V1_sen_0 just before abnormality determination.

Figure 18:
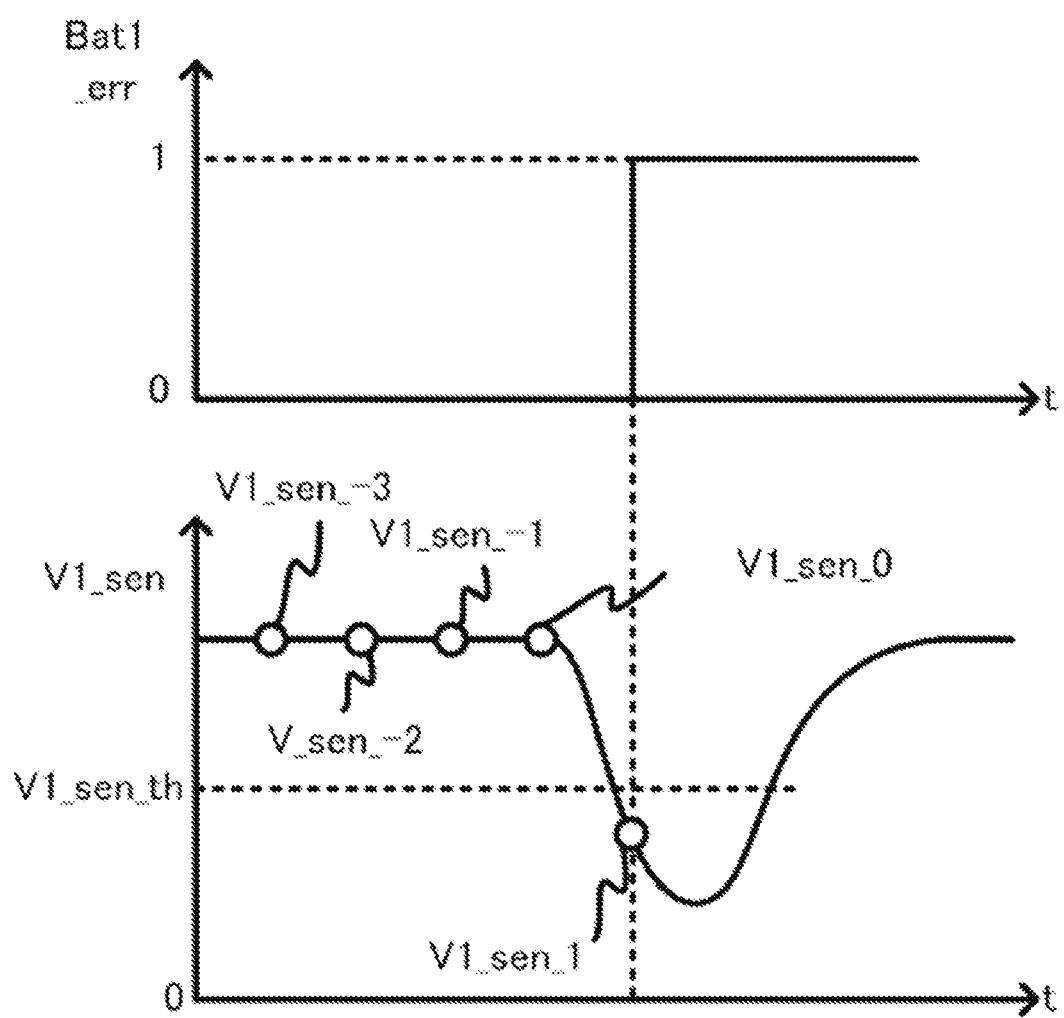
FIG. 18 is a schematic operation waveform diagram of a primary-side voltage detection value before and after constant control switchover in embodiment 4 of the present invention.

FIG. 18 is a schematic operation waveform diagram of the error signal Bat1_err of the first battery 1, and the primary-side voltage detection value V1_sen. The definition of the detection value is the same as that in embodiment 3.

The first fixed manipulated variable calculation unit 101 receives the primary-side voltage detection value V1_sen_0 just before abnormality determination and the secondary-side voltage detection value V2_sen_0 just before abnormality determination, and calculates the first fixed manipulated variable DFix1. Thus, sharp change in the manipulated variable Dh for the first switching element 5 can be suppressed and sharp change in the primary-side voltage V1 is suppressed, whereby it becomes possible to perform voltage control so as not to fall below the operable lower limit voltage of the first load 2. Similarly, the second fixed manipulated variable calculation unit 103 receives the secondary-side voltage detection value average value V2_sen_0 just before abnormality determination and the primary-side voltage detection value V1_sen_0 just before abnormality determination, and calculates the second fixed manipulated variable DFix2.

Embodiment 5

Figure 19:
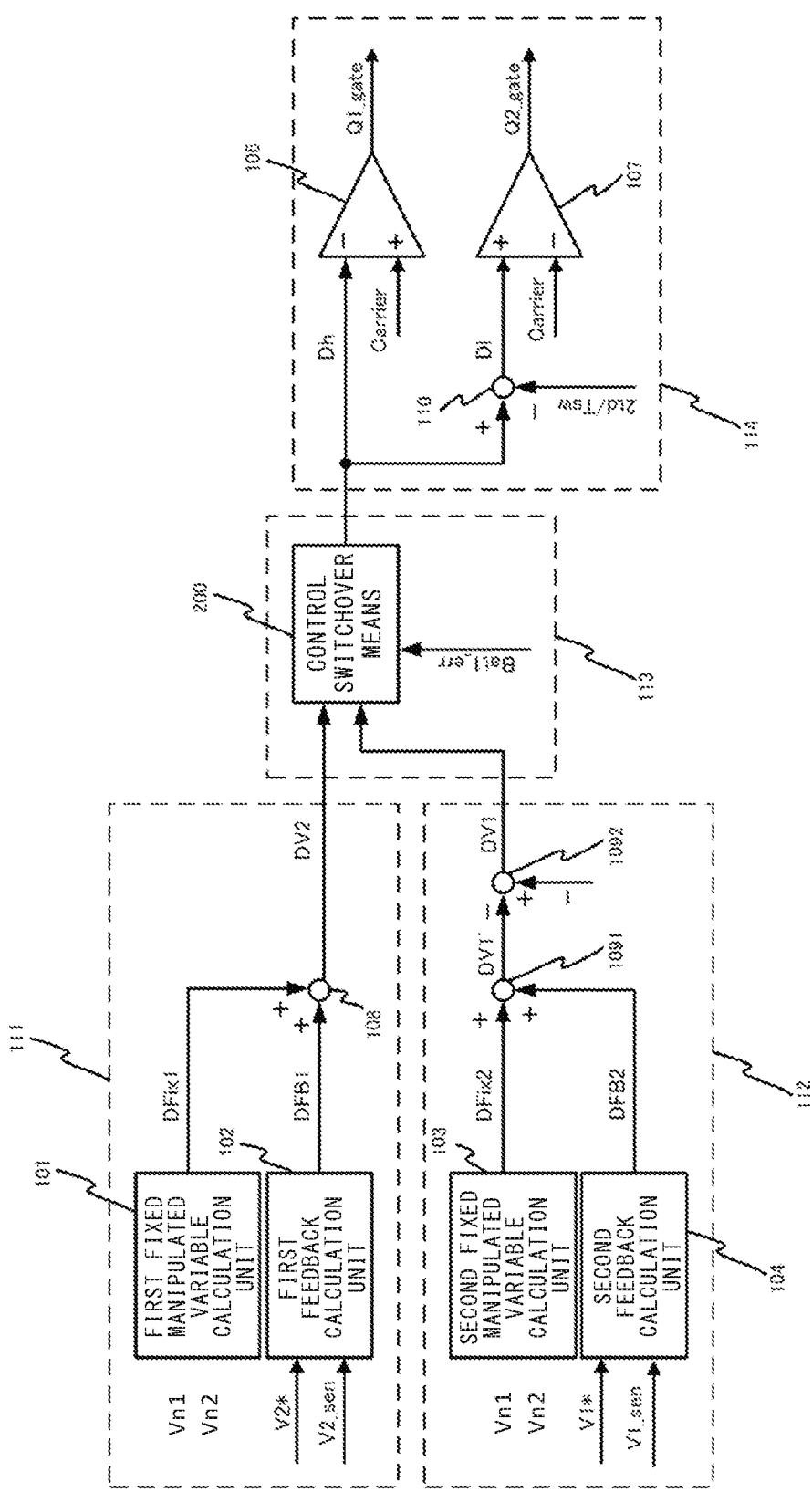
FIG. 19 is a function block diagram of a control unit in embodiment 5 of the present invention.

The circuit configuration and operation of a power conversion device according to embodiment 5 of the present invention are the same as those shown in embodiment 1. FIG. 19 is a function block diagram of the control unit 100. The control function is basically the same as that in embodiment 1, and therefore only difference will be described. The difference is that inputs to the first fixed manipulated variable calculation unit 101 and inputs to the second fixed manipulated variable calculation unit 103 are a nominal value Vn1 of the first battery 1 and a nominal value Vn2 of the second battery 11.

The first fixed manipulated variable calculation unit 101 calculates the first fixed manipulated variable DFix1 from the nominal value Vn1 of the first battery 1 and the nominal value Vn2 of the second battery 11. Thus, sharp change in the manipulated variable Dh for the first switching element 5 can be suppressed, and sharp change in the primary-side voltage V1 is suppressed, whereby it becomes possible to perform voltage control so as not to fall below the operable lower limit voltage of the first load 2. Similarly, the second fixed manipulated variable calculation unit 103 calculates the second fixed manipulated variable DFix2 from the nominal value Vn1 of the first battery 1 and the nominal value Vn2 of the second battery 11. The nominal value Vn1 of the first battery 1 and the nominal value Vn2 of the second battery 11 are stored in advance in the control unit 100.

Embodiment 6

Figure 20:
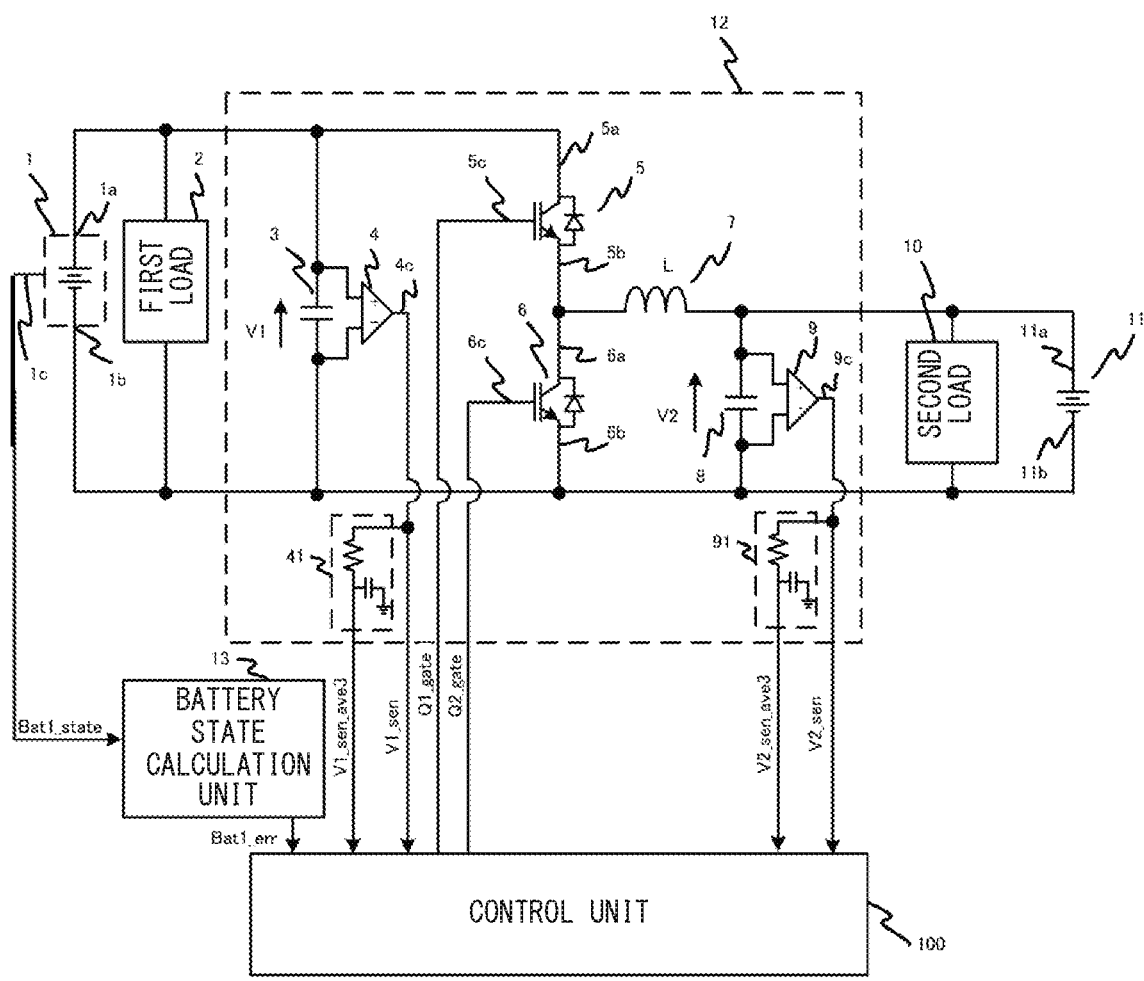
FIG. 20 is an entire configuration diagram of a power conversion device according to embodiment 6 of the present invention.

FIG. 20 is an entire configuration diagram of a power conversion device according to embodiment 6 of the present invention. The circuit configuration and operation of the power conversion device according to embodiment 6 of the present invention are basically the same as those shown in embodiment 1. Therefore, description of the same parts is omitted and only difference will be described. The difference is that the power conversion unit 12 includes a first filter circuit unit 41 which outputs the average value of the primary-side voltage detection value, and a second filter circuit unit 91 which outputs the average value of the secondary-side voltage detection value. The input end of the first filter circuit unit 41 is connected to the output terminal 4c of the first voltage detection unit 4, and the output end thereof is connected to the control unit 100. The input end of the second filter circuit unit 91 is connected to the output terminal 9c of the second voltage detection unit 9, and the output end thereof is connected to the control unit 100. The first filter circuit unit 41 outputs an average value V1_sen_ave3 of the primary-side voltage detection value V1_sen, and the second filter circuit unit 91 outputs an average value V2_sen_ave3 of the secondary-side voltage detection value V2_sen. The first filter circuit unit 41 and the second filter circuit unit 91 are analog circuits and each output one value from the instantaneous voltage value. In terms of operation of the power conversion device, there is no response to minute change in the generated voltage, and therefore outputs of the first and second filter circuit units 41, 91 are considered to be average values.

Figure 21:
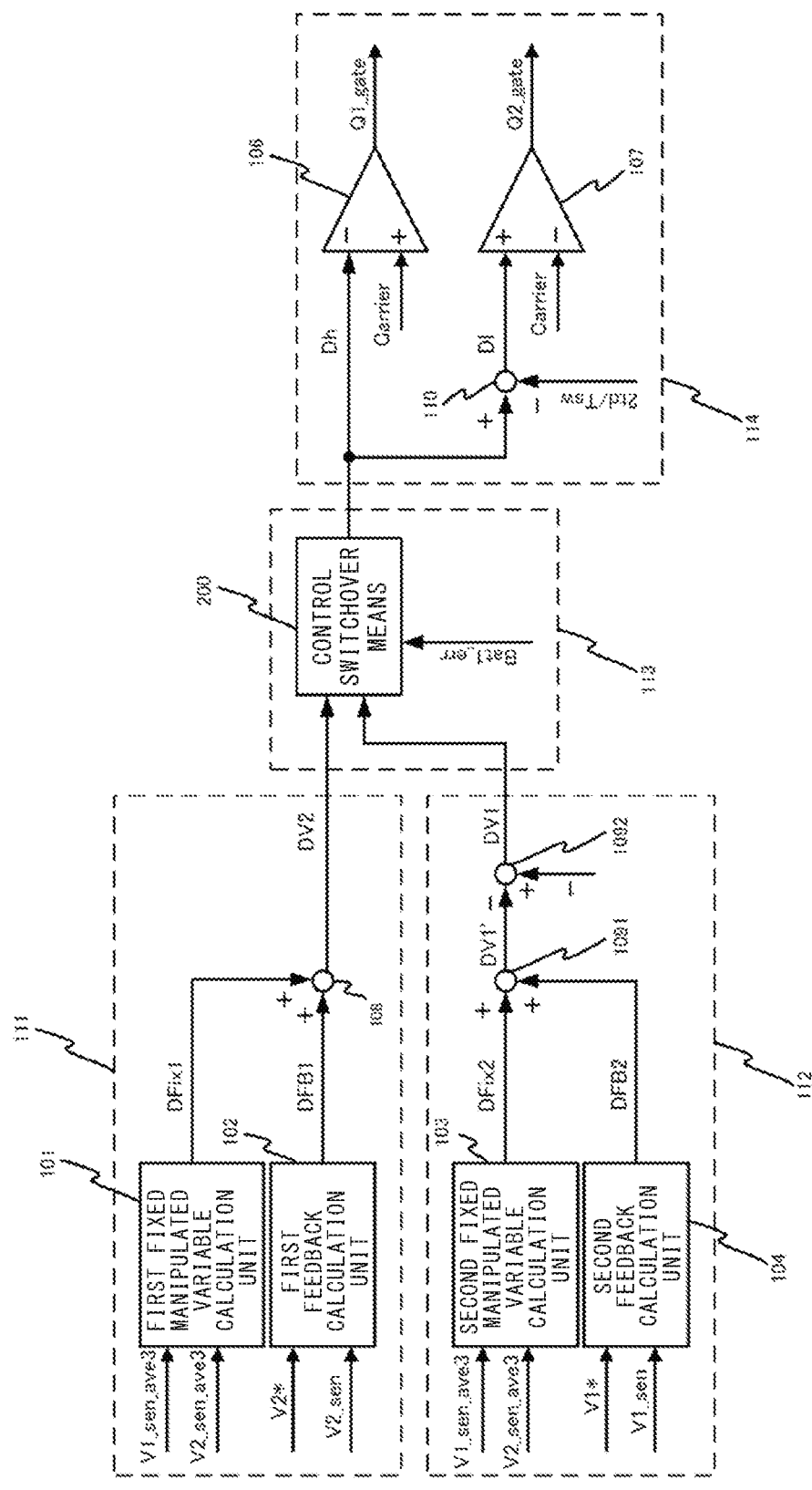
FIG. 21 is a function block diagram of a control unit in embodiment 6 of the present invention.

FIG. 21 is a function block diagram of the control unit 100. The control function is basically the same as that in the embodiment 1, and therefore only difference will be described.

The difference is as follows. The first fixed manipulated variable calculation unit 101 receives the average value V1_sen_ave3 of the primary-side voltage detection value V1_sen, and the average value V2_sen_ave3 of the secondary-side voltage detection value V2_sen, and calculates the first fixed manipulated variable DFix1. Thus, sharp change in the manipulated variable Dh for the first switching element 5 can be suppressed, and sharp change in the primary-side voltage V1 is suppressed, whereby it becomes possible to perform voltage control so as not to fall below the operable lower limit voltage of the first load 2.

Similarly, the second fixed manipulated variable calculation unit 103 receives the average value V2_sen_ave2 of the secondary-side voltage detection value before abnormality determination and the average value V1_sen_ave of the primary-side voltage detection value V1_sen before abnormality determination, and calculates the second fixed manipulated variable DFix2.

It is noted that, within the scope of the present invention, the above embodiments may be freely combined with each other, or each of the above embodiments may be modified or simplified as appropriate. In addition, the same reference characters denote parts having the same or corresponding configurations or functions.

DESCRIPTION OF THE REFERENCE CHARACTERS 1 first battery
2 first load
3 input capacitor
4 first voltage detection unit
5 first switching element
6 second switching element
7 reactor
8 output capacitor 9 second voltage detection unit
10 second load
11 second battery
12 power conversion unit
13 battery state calculation unit
100 control unit
111 secondary-side voltage constant control calculation unit
112 primary-side voltage constant control calculation unit
113 control switchover unit
114 gate drive signal generation unit
200 control switchover means

The invention claimed is:

1. A power conversion device comprising:
a power converter having a primary-side terminal connected to a first DC power supply and a secondary-side terminal connected to a second DC power supply, the power converter being configured to perform power conversion of power input from one of the primary-side terminal and the secondary-side terminal, and output the converted power from other terminal among the primary-side terminal and the secondary-side terminal;
a first voltage detector configured to detect voltage between the power converter and the primary-side terminal;
a second voltage detector configured to detect voltage between the power converter and the secondary-side terminal;
a controller configured to calculate a first manipulated variable and a second manipulated variable, for controlling output voltage of the power converter,
wherein the controller comprises:
a first calculator configured to receive, as input values, a first predetermined fixed value, a second predetermined fixed value, a second detected voltage value detected by the second voltage detector, and a second voltage command value, and calculate the second manipulated variable based on the first predetermined fixed value, the second predetermined fixed value, the second detected voltage value, and the second voltage command value, and
a second calculator configured to receive, as input values, the first predetermined fixed value, the second predetermined fixed value, a first detected voltage value detected by the first voltage detector, and a first voltage command value, and calculate the first manipulated variable based on the first predetermined fixed value, the second predetermined fixed value, the first detected voltage value, and the first voltage command value.

2. The power conversion device according to claim 1, wherein the first predetermined fixed value is calculated based on an average value of detected voltage from the first voltage detector, and
the second predetermined fixed value is calculated based on an average value of detected voltage from the second voltage detector.

3. The power conversion device according to claim 2, wherein the average value of the detected voltage from the first voltage detector is an output of an analog filter connected to the first voltage detector, and the average value of the detected voltage from the second voltage detector is an output of an analog filter connected to the second voltage detector.

4. A power conversion device comprising:
a power converter having a primary-side terminal connected to a first DC power supply and a secondary-side terminal connected to a second DC power supply, the power converter being configured to perform power conversion of power input from one of the primary-side terminal and the secondary-side terminal, and output the converted power from other terminal among the primary-side terminal and the secondary-side terminal;
a first voltage detector configured to detect voltage between the power converter and the primary-side terminal;
a second voltage detector configured to detect voltage between the power converter and the secondary-side terminal;
a controller configured to calculate a first manipulated variable and a second manipulated variable, for controlling output voltage of the power converter; and
a power supply monitor configured to detect abnormality of the first DC power supply,
wherein the controller includes:
a first calculator configured to:
receive, as input values, a first fixed value, a second fixed value, a second detected voltage value detected by the second voltage detector, and a second voltage command value,
calculate a first fixed manipulated variable based on the first fixed value and the second fixed value,
calculate a first feedback manipulated variable based on the second detected voltage value and the second voltage command value, and
calculate the second manipulated variable based on the first fixed manipulated variable and the first feedback manipulated variable, and
a second calculator configured to:
receive, as input values, the first fixed value, the second fixed value, a first detected voltage value detected by the first voltage detector, and a first voltage command value,
calculate a second fixed manipulated variable based on the first fixed value and the second fixed value,
calculate a second feedback manipulated variable based on the first detected voltage value and the first voltage command value, and
calculate the first manipulated variable based on the second fixed manipulated variable and the second feedback manipulated variable, and
a switch configured to switch between the first manipulated variable and the second manipulated variable in accordance with detection of the abnormality by the power supply monitor.

5. The power conversion device according to claim 4, wherein each of the first fixed value and the second fixed value is calculated based on an average value of the voltage detected by the first voltage detector and an average value of the voltage detected by the second voltage detector.

6. The power conversion device according to claim 5, wherein the average value of the voltage detected by the first voltage detector and the average value of the voltage detected by the second voltage detector are values calculated by averaging the respective detected voltages acquired before the power supply monitor detects the abnormality.

7. The power conversion device according to claim 5, wherein the average value of the voltage detected by the first voltage detector is output from an analog filter connected to the first voltage detector, and
the average value of the voltage detected by the second voltage detector is output from an analog filter connected to the second voltage detector.

8. The power conversion device according to claim 4, wherein each of the first fixed value and the second fixed value is calculated based on the voltage detected by the first voltage detector and the voltage detected by the second voltage detector just before the power supply monitor detects the abnormality.

9. The power conversion device according to claim 4, wherein each of the first fixed value and the second fixed value is calculated based on a nominal value of voltage of the first DC power supply and a nominal value of voltage of the second DC power supply.

10. The power conversion device according to claim 4, wherein the power supply monitor detects the abnormality based on the first detected voltage value.

11. The power conversion device according to claim 4, wherein the power supply monitor detects the abnormality based on a battery state signal output from the first DC power supply.

12. The power conversion device according to claim 4, wherein the power supply monitor detects the abnormality based on current flowing through the power converter.

\* \* \* \* \*